United States Patent
Creissen

(10) Patent No.: US 11,302,523 B1
(45) Date of Patent: Apr. 12, 2022

(54) SYSTEM AND METHOD FOR OPTIMIZING SPRAY DEPOSITION PARAMETERS

(71) Applicant: HTX Technologies, LLC, Chapel Hill, NC (US)

(72) Inventor: Alain J. Creissen, Chapel Hill, NC (US)

(73) Assignee: HTX Technologies, LLC, Chapel Hill, NC (US)

( * ) Notice: Subject to any disclaimer, the term of this patent is extended or adjusted under 35 U.S.C. 154(b) by 433 days.

(21) Appl. No.: 16/142,064

(22) Filed: Sep. 26, 2018

Related U.S. Application Data

(60) Provisional application No. 62/563,353, filed on Sep. 26, 2017.

(51) Int. Cl.

| | | |
|---|---|---|
| H01J 49/16 | (2006.01) | |
| G01N 21/01 | (2006.01) | |
| G01N 30/60 | (2006.01) | |
| G01N 30/84 | (2006.01) | |
| H01J 49/04 | (2006.01) | |
| B05B 7/08 | (2006.01) | |
| B05B 7/16 | (2006.01) | |

(Continued)

(52) U.S. Cl.
CPC ............ *H01J 49/164* (2013.01); *B05B 7/066* (2013.01); *B05B 7/0815* (2013.01); *B05B 7/162* (2013.01); *G01N 1/22* (2013.01); *G01N 21/01* (2013.01); *G01N 30/6052* (2013.01); *G01N 30/84* (2013.01); *H01J 49/0418* (2013.01); *G01N 2030/027* (2013.01)

(58) Field of Classification Search
None
See application file for complete search history.

(56) References Cited

U.S. PATENT DOCUMENTS 5,770,272 A * 6/1998 Biemann ................ B05B 12/18
427/162
5,772,964 A * 6/1998 Prevost .................. G01N 21/01
210/198.2

(Continued)

FOREIGN PATENT DOCUMENTS

| CN | 204107742 U | * | 1/2015 | |
| CN | 204107742 U | | 1/2015 | |
| GB | 751001 A | * | 6/1956 | ............... H01B 3/40 |

OTHER PUBLICATIONS

English translation of CN204107742U (Year: 2015).*
USPTO; Non-Final Office Action for U.S. Appl. No. 15/900,754 dated Dec. 19, 2018, 13 pages.

*Primary Examiner* — Matthew D Krcha
(74) *Attorney, Agent, or Firm* — NK Patent Law

(57) ABSTRACT

A system for depositing a chemical of one or more components onto a substrate is provided. The system includes a spray assembly for depositing the chemical, a substrate for collecting the one or more components forming the chemical, and an enclosure for housing the substrate and the spray assembly. The spray assembly includes a capillary for receiving and ejecting a fluid containing the one or more components, a nozzle for receiving and ejecting a gas towards both the substrate and the fluid when the fluid is ejected from the capillary, and a spray heater for heating the capillary and the gas. The enclosure includes a translatable drawer for supporting and translating the substrate. The system further includes a substrate heater for heating the substrate.

12 Claims, 25 Drawing Sheets

(51) Int. Cl.
  *B05B 7/06* (2006.01)
  *G01N 1/22* (2006.01)
  *G01N 30/02* (2006.01)

(56) References Cited

U.S. PATENT DOCUMENTS

| | | | | |
|---|---|---|---|---|
| 2003/0228240 | A1* | 12/2003 | Dwyer | H01J 49/0418 422/400 |
| 2008/0116056 | A1* | 5/2008 | Folestad | G01N 22/04 204/157.15 |
| 2008/0190362 | A1* | 8/2008 | Takeuchi | B05B 13/0447 118/323 |
| 2009/0252874 | A1* | 10/2009 | Essien | B05B 7/0075 427/255.25 |
| 2010/0037919 | A1* | 2/2010 | Doebelin | B08B 9/0325 134/22.12 |
| 2013/0266735 | A1* | 10/2013 | Garrett | B05D 1/02 427/424 |

* cited by examiner

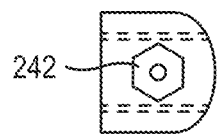
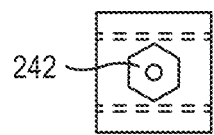
FIG. 10D FIG. 10E
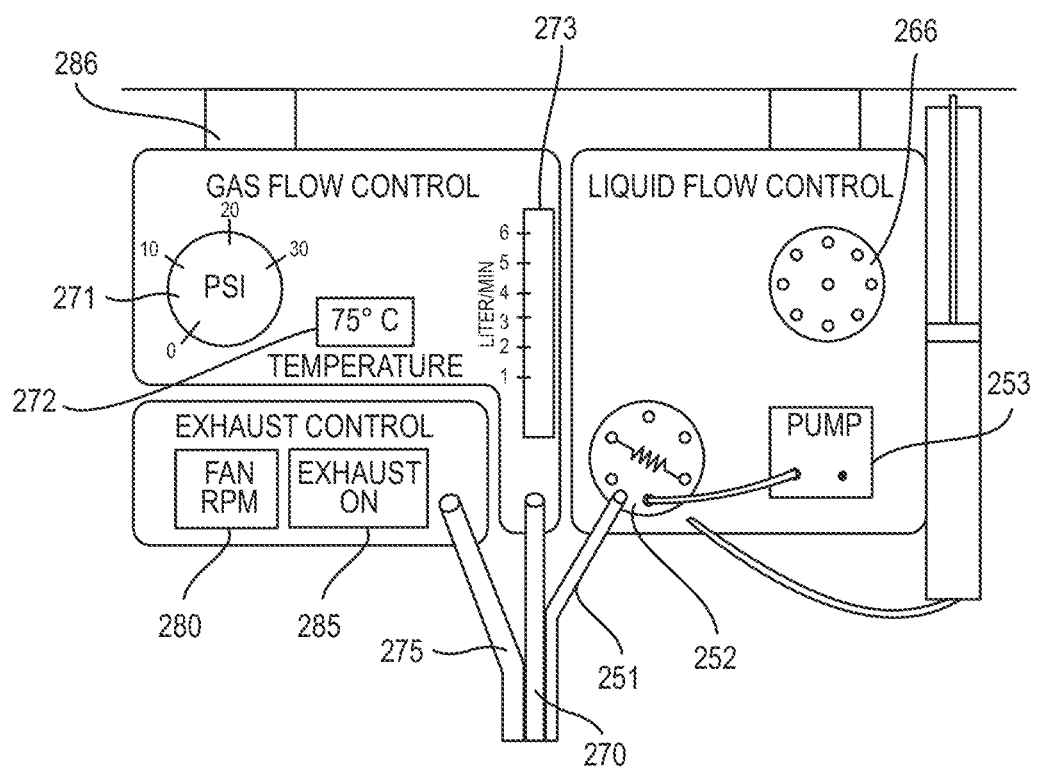
FIG. 11

SYSTEM AND METHOD FOR OPTIMIZING SPRAY DEPOSITION PARAMETERS

CROSS-REFERENCE TO RELATED APPLICATIONS

This application claims priority to U.S. Provisional Application No. 62/563,353, filed Sep. 26, 2017, the entire content of which is hereby incorporated by reference herein.

TECHNICAL FIELD

The presently disclosed subject matter is generally directed to systems and methods for optimizing spray deposition parameters. Specifically, the presently disclosed subject matter relates to a system and method for spray deposition of dissolved reactive and non-reactive chemicals onto biological sample surfaces for subsequent analysis by mass spectrometry.

BACKGROUND

Systems and methods for spray deposition of chemicals prior to analysis are well known. For example, U.S. Pat. No. 5,772,964 to Prevost discloses a nozzle arrangement that enables deposition of chemicals on discs for IR-Analysis. Such arrangement has also been used to deposit chemicals onto inert planar sample surfaces for MALDI mass spectrometry analysis, as set forth in U.S. Patent Application Publication No. 2003/0228240 A1 to Dwyer. The chemical spray depositions can be placed on a surface or sample involved in a variety of processes, including (but not limited to) subsequent analysis using MALDI mass spectrometry, as described in U.S. Pat. No. 5,770,272 to Biemann.

While various spray assemblies have been developed for coating a planar surface, the desire for enhanced quantitative and qualitative controls of chemical depositions continues to exist. As analysis techniques continue to improve (e.g., analyzers offer high spatial resolution and sensitivity, such as Bruker RapifleX® MALDI TissueTyper®), the location, size, penetration, and general manner of the physical parameters affecting the chemical deposition can be controlled. Particularly, the deposition step, drying, and incubation of dissolved chemicals onto the substrate surface greatly affect the signal intensity and spatial resolution attainable on the analyzer. Further, the timing, rate of application, temperature, and pressure of the solvent substrate, spraying gas, and chamber, concentration of the chemicals in solution, and the composition of the solvent mixture are all factors affecting the chemical nature of the chemical deposition, the chemical reactions within the tissue, and are reflected in the analytical results. As analysis techniques continue to diversify, the ability to customize each chemical spray deposition for new analysis processes can be beneficial. The presently disclosed subject matter provides enhanced uniformity of chemical deposits, enabling greater control over the solvent evaporation, and allowing for more efficient and error-free operation of chemical-depositing systems.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In some embodiments, the presently disclosed subject matter is directed to a system for depositing a chemical layer of one or more components onto a substrate. Particularly, the system comprises a spray assembly for depositing the chemical layer onto the substrate. The spray assembly comprises a capillary for receiving and ejecting a fluid comprising the one or more components, a nozzle for receiving and ejecting a gas towards both the substrate and the fluid when the fluid is ejected from the capillary to create an atomized spray, and a heater for heating the capillary and the gas. The assembly further comprises an enclosure for housing the substrate and the spray assembly. The enclosure includes a translatable drawer for supporting and translating the substrate. The system comprises a sensor to automatically measure the wetness of the spray, and a flow control station to directly control a flow rate, pressure, or both of the gas when ejected from the nozzle to affect the wetness or dryness of the spray.

In some embodiments, the spray assembly is translatable in two perpendicular directions for maneuvering the spray assembly with respect to the substrate.

In some embodiments, the system further comprises a substrate heater for heating the substrate, the drawer, or both.

In some embodiments, the system further includes a humidity chamber positioned on a top face of the drawer to perform temperature and humidity controlled chemical reaction, such as enzymatic digestion, derivatization and rehydration.

In some embodiments, the spray heater includes a fluid spray heater and a gas spray heater, each of the heaters being independently operable.

In some embodiments, the sensor measures wetness of a sample based on a determination of an electrical resistance of a test surface and the time to recover to a normal electrical resistance.

In some embodiments, the flow control station uses an algorithm to allow automated adjustment of the flow rate, pressure, or both of the gas.

In some embodiments, the system further includes a second capillary for receiving and ejecting a second fluid containing one or more secondary components.

In some embodiments, the system further includes a second nozzle for receiving and ejecting a second gas towards the substrate and/or the fluid when the fluid is ejected from the capillary.

In some embodiments, the spray assembly is configured on one side of the flow control station and the electronic controls of a robot can be connected to the opposite side of the flow control station.

In some embodiments, the flow control station comprises a flexible harness comprising the elements of the spray assembly functionality.

In some embodiments, the nozzle is configured as a monoblock, dual block, or separated block arrangement.

In some embodiments, the assembly includes one or more switching valves for switching from the fluid and/or gas to a second fluid and/or second gas.

In some embodiments, the presently disclosed subject matter is directed to a method of depositing a chemical layer of one or more components onto a substrate. The method comprises translating the drawer of a spray assembly to an open position, wherein the spray assembly comprises a capillary for receiving and ejecting a fluid comprising the one or more components; a nozzle for receiving and ejecting a gas towards both the substrate and the fluid when the fluid is ejected from the capillary to create an atomized spray; a heater for heating the capillary and the gas; an enclosure for housing the substrate and the spray assembly, the enclosure including a translatable drawer for supporting and translating the substrate; a sensor to automatically measure the wetness of the spray; and a flow control station to directly control a flow rate, pressure, or both of the gas when ejected from the nozzle to affect the wetness or dryness of the spray. The method further includes positioning the substrate on a support of the drawer, translating the drawer to a closed position wherein the substrate is positioned adjacent to the spray nozzle and within an interior of the enclosure, and atomizing a stream of chemical from the nozzle onto the substrate.

In some embodiments, the method comprises adjusting the wetness or dryness of the spray to a desired level using the flow control station.

In some embodiments, the method further comprises automatically adjusting the flow rate, pressure, or both of the gas using an algorithm.

BRIEF DESCRIPTION OF THE DRAWINGS

The previous summary and the following detailed descriptions are to be read in view of the drawings, which illustrate particular exemplary embodiments and features as briefly described below. The summary and detailed descriptions, however, are not limited to only those embodiments and features explicitly illustrated.

FIG. 1*b* is a front plan view of the spray assembly of FIG. 1*a*.

FIGS. 1*c* and 1*d* are perspective views of the spray assembly of FIG. 1*a*.

FIG. 10*a* is a front view of one embodiment of sprayer nozzle comprising a capillary cartridge.

FIGS. 10*b* and 10*c* are left and right side plan views, respectively, of the nozzle of FIG. 10*a*.

FIGS. 10*d* and 10*e* are top plan views of the nozzle of FIGS. 10*b* and 10*c*, respectively.

FIG. 11 is a front view of one embodiment of the disclosed flow control station, showing controls for the gas flow, liquid flow, and exhaust control.

FIG. 19*b* is a top plan view of the trail of FIG. 19*a*.

FIG. 20 is a front view of one embodiment of an electrical sensor configured with a plurality of end points.

FIG. 21 is a front view of one embodiment of a sensor plate in accordance with some embodiments of the presently disclosed subject matter.

FIG. 22 is a front view of one embodiment of an electrical sensor comprising a printed circuit.

FIG. 23 is a front view of one embodiment of a printed circuit integrated in the sample holder of a sprayer.

FIG. 24 is a front view of one embodiment of an electrical sensor that uses weight change as a measure of evaporation end amount deposited.

FIGS. 25*a* and 25*b* are perspective views illustrating two proposed layouts of a solvent delivery module in accordance with some embodiments of the presently disclosed subject matter.

FIGS. 26*a* and 26*b* illustrate side and front views, respectively, of one embodiment of a solvent delivery module.

FIG. 27 is a perspective view illustrating one embodiment of a proposed layout of a solvent delivery module.

DETAILED DESCRIPTION

The descriptions herein are presented with sufficient details to provide an understanding of one or more particular embodiments of broader inventive subject matters. The descriptions expand upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" can be expressly used or implied relating to features of processes or methods, no implication is made of any particular order or sequence among such expressed or implied steps unless an order or sequence is explicitly stated.

Figure 1A:
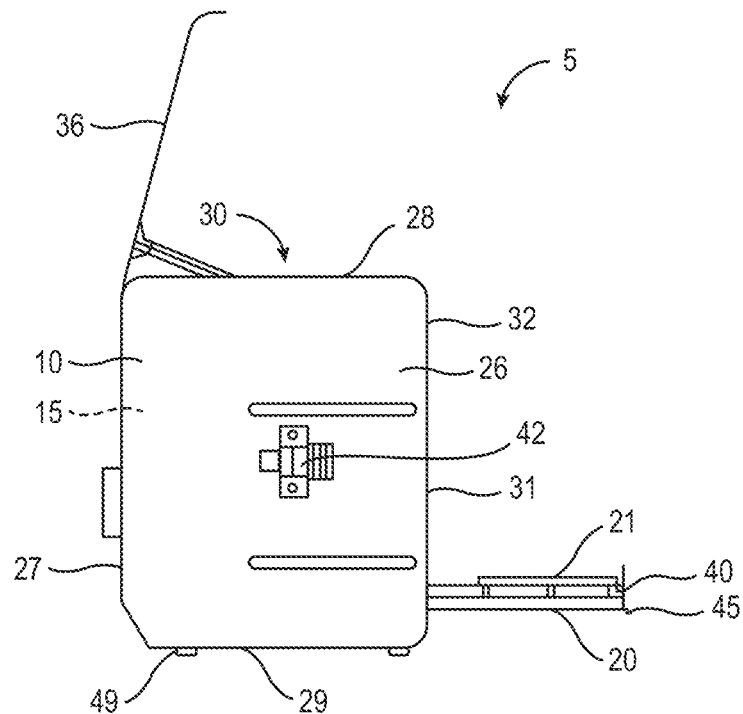
FIG. 1*a* is a side plan view of a spray assembly in accordance with some embodiments of the presently disclosed subject matter.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Following long standing patent law convention, the terms "a", "an", and "the" refer to "one or more" when used in the subject application, including the claims.

The terms "comprises" and "comprising" are intended to have the broad meaning ascribed to them in U.S. Patent Law and can mean "includes", "including", and the like.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

The presently disclosed subject matter is directed to a system and method of optimizing spray deposition for depositing a chemical layer onto a substrate. The term "spray deposition" refers generally to the process of atomizing and spraying one or more target molecules onto a surface as a chemical layer. Particularly, the chemical layer is produced by spraying of a chemical dissolved in a solvent (e.g., chemical solution), and evaporating the solvent upon deposition. Any suitable chemical solvent can be used, including (but not limited to) internal standards, derivatization agents, enzymes (e.g., trypsin), matrices (e.g., MALDI matrices), extraction solvents (e.g., chloroform), rehydrating solvents (e.g., water and/or ammonium bicarbonate), or combinations thereof. The surface can include any suitable substrate known or used in the art, including (but not limited to) glass slides, glass sheets, chemically inert discs, and the like. In some embodiments, the substrate can be pre-coated as desired.

Figure 1B:
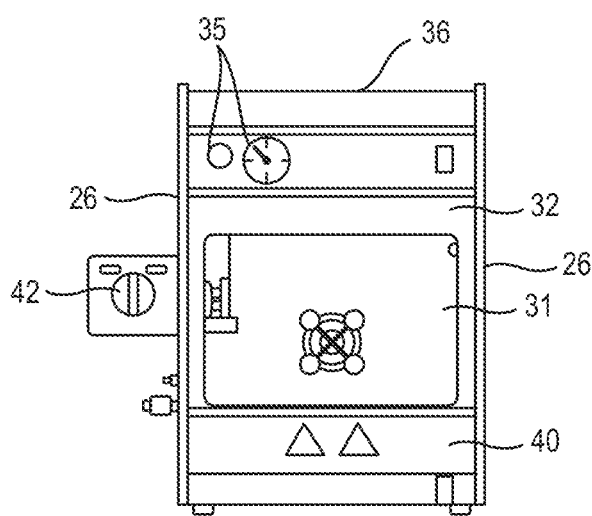
Figure 1C:
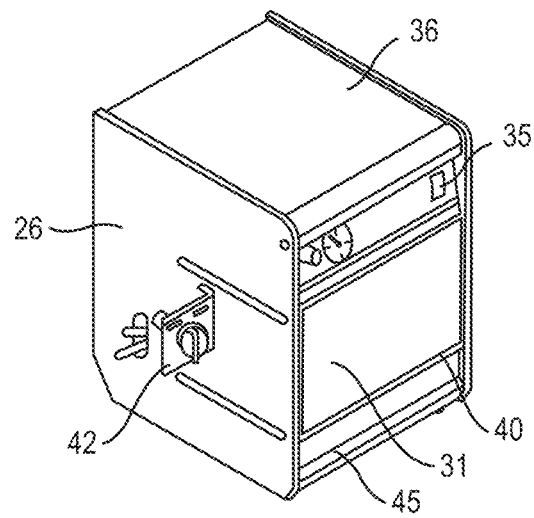
Figure 1D:
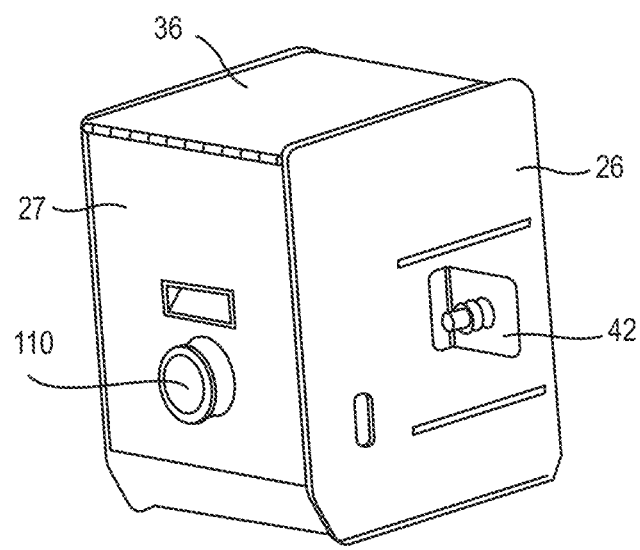

FIGS. 1a-1d illustrate one embodiment of system 5 comprising spray assembly 10 for depositing a chemical layer onto a substrate. The spray assembly includes interior compartment 15 for housing the substrate and a spray assembly. As depicted in FIGS. 1b and 1c, the assembly can be maneuvered from an open to a closed position for providing isolation to the interior 15. When desired by the user, the interior can be accessed, such as by the opening of drawer 20. Further, interior 15 can be sealed and/or isolated from the external environment by a plurality of panels that enclose the interior. For example, the panels can include opposing side panels 26, back panel 27, top panel 28, bottom panel 29, front viewing panel 31, and/or front panel 32.

As shown in FIGS. 1b and 1c, front viewing panel 31 can be at least partially transparent to allow a user to view interior compartment 15. To this end, the viewing panel can be constructed from any known transparent or partially transparent material, such as (but not limited to) glass, plexiglass, plastic, and the like. In some embodiments, the viewing panel can be tinted, polarized, or UV-protected as desired by the user. In some embodiments, internal compartment 15 can include one or more light sources to illuminate the contents of the internal compartment for viewing. Suitable light sources can include (but are not limited to) fluorescent bulbs, incandescent lights, LEDs, and the like. The light source can be switched on and off manually or through an automatic control (e.g., when the sprayer is activated). Interior compartment 15 of the disclosed sprayer can be accessed when desired. For example, front viewing panel 33 can be selectively fastened to the sprayer and/or to other panels for permitting access to the interior compartment and/or to components housed within the interior compartment (e.g., gutter, axis, spray assembly, sections, connections, filters, sensors, and/or any other portion of the system, as described in more detail herein below). It should be appreciated that any desired panel can be configured to be removable, not just viewing panel 31 (e.g., front panel, top panel, bottom panel, back panel, and/or side panels).

In some embodiments, front panel 32 comprises one or more controls and/or displays 35 that can be used to manage sprayer 10. For example, the controls and/or displays can include a power switch, temperature display, clock, timer, pressure display, safety valve, and the like. It should be appreciated that the controls/displays can be configured on one or more panel, and are not limited to front panel 32.

In some embodiments, one or more components 30 of the system can be positioned above top panel 28. Components 30 can include (but are not limited to) switches, sensors, electronics, wiring, tubing, displays, and/or other components for operating system 5. Lid 36 can be positioned above and parallel to top panel 28 for housing components 30 therebetween. Lid 36 can be removable and/or pivotable for providing access to components 30. For embodiments of the spray assembly that include both top panel 28 and lid 36, interior 15 and components 30 can both remain sealed or isolated from the external environment when the lid is in the closed position. Further, the lid can protect interior 15 from the operation of components 30. The user can therefore access components 30 by removing or pivoting the lid without exposing interior 15 to the external environment.

As shown in FIGS. 1a and 1b, in some embodiments, sprayer 10 can include a plurality of feet 49 to provide stability to the device. In some embodiments, feet 49 can be adjustable, such as to level the sprayer when placed on an uneven surface. The feet can also be used to the raise the height of sprayer 10 to a desired level. Further, the feet can function minimize vibrations and the like. It should be appreciated that feet 49 are optional and the presently disclosed subject matter includes sprayer embodiments that lack feet.

FIGS. 1a and 1b illustrate that at least one panel of sprayer 10 can include selector valve 42 that selects between two or more positions that alter the flow path of a fluid. For example, the selector valve can be used to alternate between a first fluid used during spray deposition to a second fluid used for conditioning and/or washing applications. The selector valve can be manually adjusted by a user, or it can be automatically updated using a computer or other control mechanism.

Front panel 32 comprises drawer 20 for supporting substrate 21 and for translating the substrate to and from interior 15. Drawer 20 can include front panel 40 positioned proximal to and below front viewing panel 31. Drawer 20 can further include gripping element 45, such as a handle and/or protuberance, for translating the drawer manually. As illustrated in FIG. 1a, when drawer 20 is translated away from interior 15, the spray assembly is in an open position and the interior is exposed to the external environment. However, it should be appreciated that exposure of interior 15 to the external environment is minimized because the assembly front viewing panel remains in a static position when the drawer is translated.

Figure 2A:
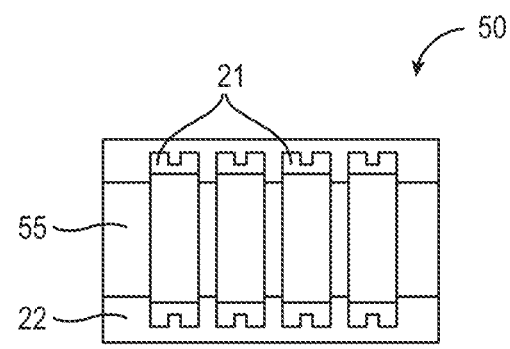
FIG. 2*a* is a top plan view of a humidity chamber in accordance with some embodiments of the presently disclosed subject matter.

In some embodiments, spray assembly 10 can include humidity chamber 50 that can be configured on a top surface of drawer 20. One embodiment of humidity chamber 50 is illustrated in FIG. 2a. As shown, chamber can be configured as a closed container with liquid 22 (e.g., water, buffer, or any other desired liquid) positioned in the bottom portion of the chamber. The humidity chamber can comprise grid 55 to support and house substrate 21. In some embodiments, the grid can support more than one substrate, such as a plurality of glass slides. Humidity chamber 50 comprises lid 60 to maintain a humid and/or heated environment with the chamber interior. The humidity chamber can be constructed from any desired material, such as (but not limited to) polymeric material, glass, metal, and the like.

Figure 2B:
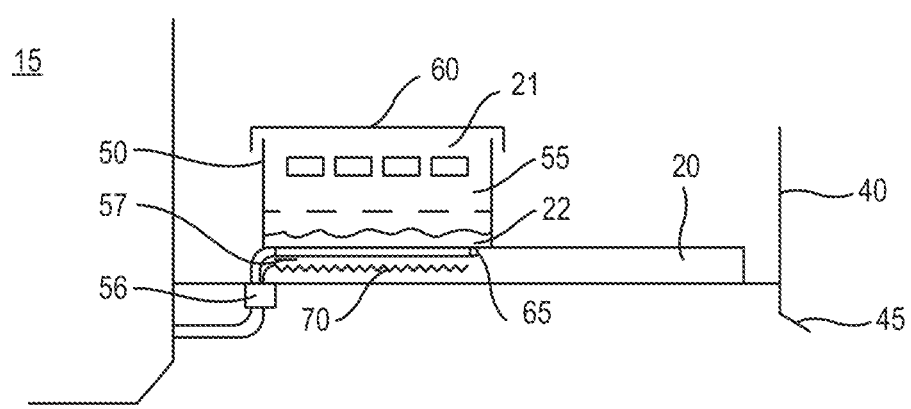
FIG. 2*b* is a side plan view of the humidity chamber of FIG. 2*a* configured on a spray assembly drawer.

As illustrated in FIG. 2b, humidity chamber 50 can be positioned on a top surface of drawer 20, in direct or indirect contact with conductive surface 65. The conductive surface can be any desired surface capable of conducting heat, such as (but not limited to) a metallic plate. Heating element 70 can be positioned under the conductive surface to thereby heat liquid 22 within the humidity chamber interior to create optimum chemical reaction conditions, such as (but not limited to) enzymatic digestion at 37° C. The heating element can be powered using any known connection, such as (but not limited to) a standard power cable 56 and/or RTD or thermocouple 57.

Figure 3:
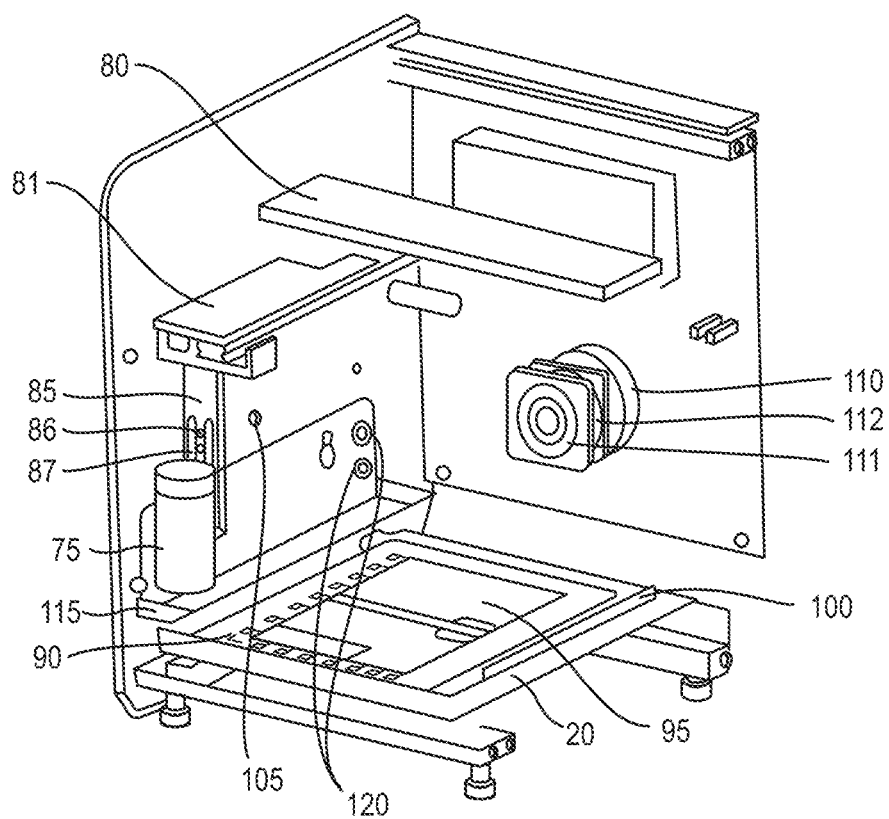
FIG. 3 is a perspective view of the interior of a spray assembly with panels removed in accordance with some embodiments of the presently disclosed subject matter.

FIG. 3 depicts one embodiment of spray assembly 10 with top panel 28, bottom panel 29, right side panel 26, front viewing panel 31, and front panel 32 removed to illustrate several optional internal system components. Particularly, sprayer 75 for depositing the chemical layer upon substrate 21 is viewable. In some embodiments, the sprayer can comprise x-axis arm 80 positioned perpendicularly to and coupled with y-axis arm 81 to allow the spray assembly to move in at least two perpendicular directions. Thus, the sprayer can be coupled to the x-axis arm and/or the y-axis arm. In this way, the spray assembly can be maneuvered with respect to substrate 21. In some embodiments, both the sprayer and the substrate can be translatable. In some embodiments, only one of the spray assembly or the substrate can change position.

Any of the wide variety of known inputs, algorithms, and/or programming can be used to control the movement of the sprayer in relation to x and y-axis arms 80, 81. In some embodiments, the sprayer can be translated in relation to the y-axis arm, and the y-axis arm can be translated in relation to the x-axis arm. Gears, motors, tracks and/or guides can be provided to aid the translation of the sprayer and/or axis arms. In some embodiments, x-axis arm 80 or y-axis arm 81 can remain in a static position. Axis engagement 85 can be positioned between, and engaged with, the spray assembly and axis arms 80, 81 for coupling the spray assembly to one of the arms. Axis engagement 85 can comprise one or more engagement apertures 86 for permitting the spray assembly to be coupled to the engagement at a fixed height from substrate 21. Engagement tracks 87 can be provided for permitting translation of the spray assembly between various heights. Automatic and/or manual controls can be provided for adjusting the height of the spray assembly. It should be appreciated that the embodiment illustrated in FIG. 3 is one example of the coupling of sprayer 75 to the system, and is not intended to be limiting.

FIG. 3 also illustrates one embodiment of sample drawer 20 including plate 90 affixed to drawer base 95. The alignment plate can include one or more cutouts in any desired shape for positioning substrate 21 therein. In some embodiments, the plate can include one or more markings that can indicate a measurement, the boundaries of substrate 21, and the like. However, it should be appreciated that in some embodiments plate 90 can be configured without apertures and/or markings. In some embodiments, the system can include one or more ridges 100 for positioning substrate 21. To this end, the plate can be removable from base 95 to permit the interchange of differing alignment plates and/or to rotate a plate to a different orientation. Advantageously, drawer 20 permits the user to adjust the position of plate 90 for a closer and more perpendicular view of the placement of the substrate.

Internal compartment 15 can include one or more apertures 105 for permitting gas and/or fluid flow from externally positioned gas and fluid reservoirs. In some embodiments, the gas and/or fluid reservoirs can be housed within interior compartment 15. The gas and fluid apertures can extend through any of the panels of the enclosure.

In some embodiments, one or more inserts can be positioned on or removably attached to drawer base 95. The inserts can be configured in any desired any shape and size. For example, an insert can be placed between base 95 and an alignment element to adjust the height and/or angle of substrate 21 relative to the spray assembly. In some embodiments, the insert can include a heater, a cooler, and/or a sensor. To this end, any desired number of sensors can be provided throughout the disclosed system for measuring and/or detecting one or more parameters. For example, suitable parameters can include (but are not limited to) air temperature, ejected fluid temperature, ejected gas temperature, chemical layer temperature, deposited fluid temperature, substrate temperature, base temperature, pressure, wetness or dryness of the chemical layer, wetness or dryness of the deposited fluid or substrate, humidity, and/or evaporation rate. Such sensors are standard and are known to those of skill in the art.

For example, in some embodiments, the disclosed system can include one or more sensors for measuring the wetness of the spray as it is injected from the sprayer nozzle. In some embodiments, the sensor(s) can be incorporated inside the chamber, away from the actual samples but accessible by the nozzle during its XY movement so that a test spray and measure can be performed.

Figure 4:
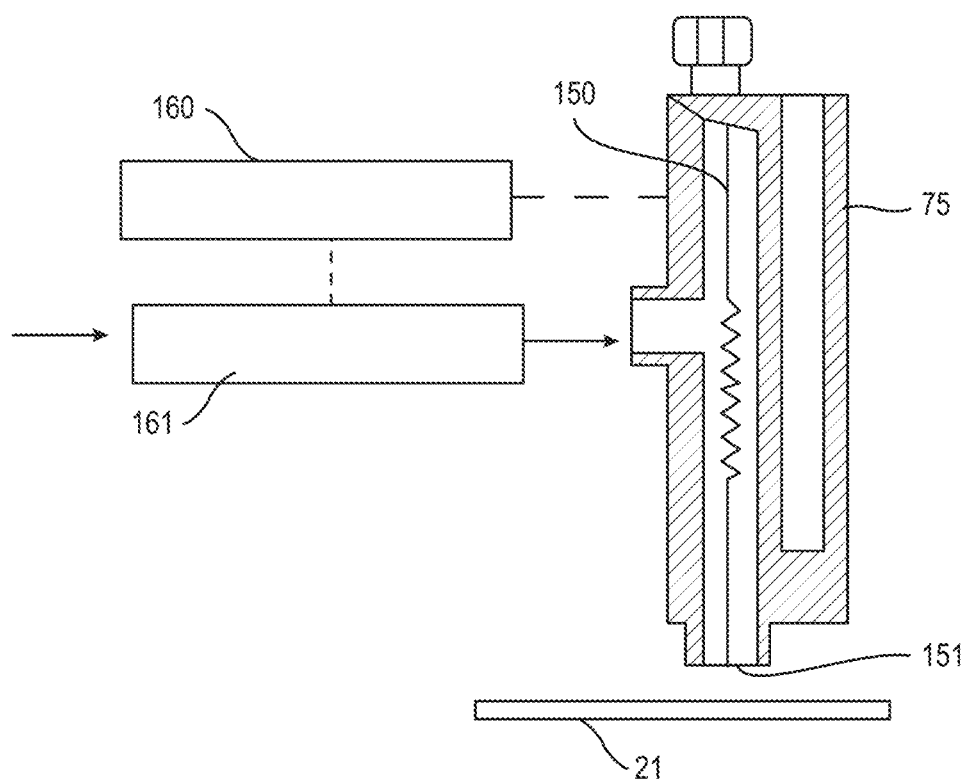
FIG. 4 is a front plan view of a sprayer nozzle in accordance with some embodiments of the presently disclosed subject matter.

As shown in FIG. 4, sprayer 75 can include nozzle 151 that comprises capillary 150 for receiving and ejecting a fluid to form a chemical layer upon substrate 21. Representative gases that can be received and/or ejected can include (but are not limited to) ambient air, nitrogen, and/or helium. Representative fluids that can be received and/or ejected can include (but are not limited to) water, methanol, ethanol, acetonitrile, acetone, and/or chloroform. In some embodiments, the disclosed system can comprise temperature controller 160 to heat (or cool) capillary 150. In some embodiments, the temperature controller can include a gas spray heater and/or a fluid spray heater, each being independently operable for independently controlling the heat of the gas and fluid. The spray heater can work in conjunction with an external heater for heating the fluid and/or gas before each is received by the spray assembly. See, for example, U.S. Pat. No. 5,772,964, incorporated by reference herein. In some embodiments, air or liquid can be preheated using preheater 161, as shown in FIG. 4.

In some embodiments, the disclosed system can comprise sprayers that include multiple capillaries 150 and/or nozzles 151. For example, a second capillary or sprayer can enable a second fluid to be sprayed for interacting with the chemical layer being formed by the first fluid. Similarly, a second nozzle or sprayer can enable a second gas to be sprayed. The additional capillary, nozzle, and/or sprayer can permit simultaneous spraying with the original spray assembly, capillary, and/or nozzle or can permit pre-spray or post-spray treatments of substrate 21 and/or the chemical layer. The spray assembly can also include an infrared heater for accelerating drying or evaporation.

Controlling the evaporation rate of a fluid while being ejected from a capillary and/or while resting upon substrate 21 can affect the 'wetness' or 'dryness' of the chemical layer being formed by the components of the fluid. The uniformity of the height, width, and/or structure of the chemical and/or the constituent rows or columns of the chemical layer as the fluid is applied to the substrate can also be affected by evaporation rates of the fluid. To further control evaporation, a substrate heater can be provided for heating drawer base 95 and/or substrate 21. The substrate heater, spray heater, and/or external heater can be controlled automatically via the various inputs, algorithms, and programming and/or by manual inputs or physical manipulations of controls located on the spray assembly.

Evaporation rates can also be controlled by the flow of air within interior compartment 15 of sprayer 10. FIG. 3 depicts fan 110 positioned on and through back panel 27 for exhausting air from the enclosure interior. It should be appreciated that fan 110 can be positioned on and through any panel of the enclosure. In some embodiments, the fan can be configured to include housing 111 for safety and/or vent 112 for filtering (e.g., particulate air) or for absorbing (e.g., charcoal filter) the air during fan exhaust. In some embodiments, fan 110 can be selectively engaged or coupled to a duct to contain and/or direct flow of the exhausted air. By providing a vent and/or duct, the disclosed system can be used in accordance with safety regulatory schemes without the need for a vented hood.

One or more tubes can house and direct flow of gas and/or fluid from one or more reservoirs to a spray assembly that includes sprayer 75. In some embodiments, the tubes can include one or more sections having a connection between the sections. When fluid and/or gas flows through an aperture of an enclosure panel and/or a gutter aperture, the flow can pass from one section, through one or more connections, to another section. Upon disengagement of a section from one of the connections, the fluid housed within the tubes can be collected by gutter 115, as shown in FIG. 3. Additionally, the gutter can collect fluid expelled from the tubes during any ejectment, cleaning, and/or sterilization processes. The gutters can be coupled to a drain line for permitting any collected fluid to flow to a collection reservoir. The collection reservoir can be positioned within the enclosure or can be external to the enclosure.

The connections, the sections of the tubes proximal the connections, and/or any other section can include one or more filters for filtering contents of the fluid and/or gas flow within the tubes. In some embodiments, the filters can be positioned within or proximal to gutter aperture 120 for permitting cleaning and/or interchange of the filters while collecting any fluid expelled during the cleaning or interchange.

The tubes can also include a switching valve along the length thereof to control the flow of fluid and/or gas between the tubes, and/or for controlling the type of fluid and/or gas flowing therethrough. In some embodiments, one or more switching valves can be activated for permitting manual or automated ejectment and/or conditioning or washing processes. For example, selector valve 42 can be used to alternate the source fluid of a tube between a fluid containing components for forming a chemical layer to a fluid for conditioning or washing the tube and/or capillary of the spray assembly. In some embodiments, an injection valve can serve as a chemical solution reservoir. In some embodiments, a 2-way valve can be used to switch the flow from two or more alternative pump flow feeds.

Figure 5:
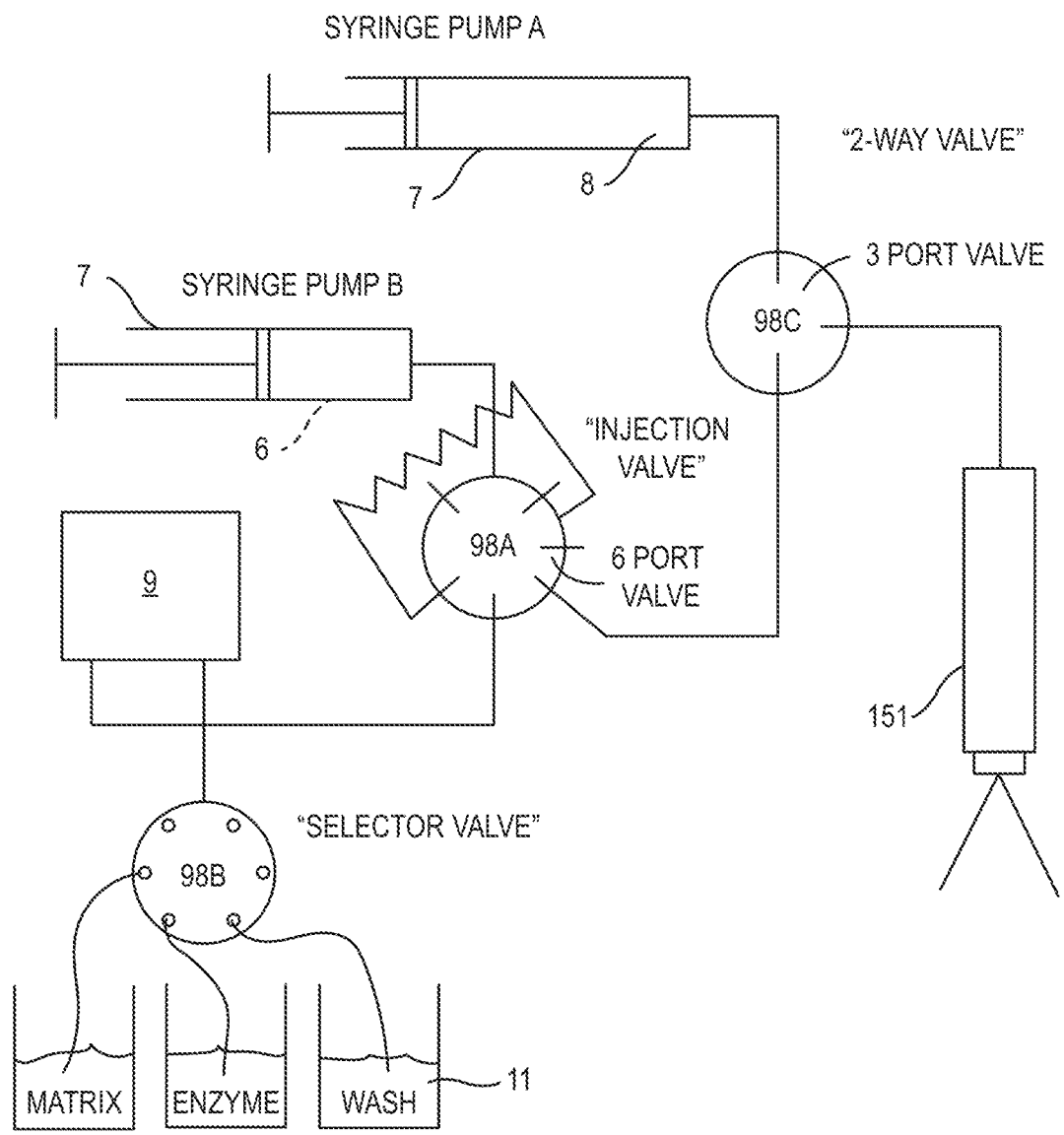
FIG. 5 is a schematic illustrating a switching valve arrangement to achieve automated transition from one liquid to another in accordance with some embodiments of the presently disclosed subject matter.

FIG. 5 illustrates one example of one example of switching valves 98 shown in arrangement to achieve automated transition from one liquid to another without interruption of spray or loss of chemicals. Particularly, as shown valves 98 can be 2, 3, 4, 5, 6, 7, 8, 9, or 10-port valves, selector valves, or combinations thereof. For example, the valves can include (6-port) injection valve 98a that allows input of first solution 6 (e.g., matrix) from applicator 7. The term "matrix" refers to a material that generates matrix-embedded analyte molecules (e.g., proteins) that are ionized from the solid phase. In some embodiments, the applicator can be a syringe. The system can also include selector valve 98b in fluid connection with one or more reservoirs 11 that house one or more fluids (e.g., matrix, enzyme, washing fluid). The disclosed system can also include two-way valve 98c that allows the input of second solution 8 (e.g., enzyme solution) from an applicator and distributes the solution to an injection valve and/or directly to spray nozzle 151. One or more pumps 9 can affect the flow of materials to and from the valves.

Pumps 9 can be included in system 10 to control the flow of fluid and/or gas therewithin. In some embodiments, pumps 9 can be provided for degasification of fluid as it flows. Degasification can be accomplished by purging the fluid at a high rate and/or by maintaining a constant flow of fluid at a low rate over a set period of time.

Methods of using system 10 can include automatically or manually translating the spray assembly into patterns for providing a more uniform chemical compared to the matrices provided by the prior art. The pattern of deposition of the fluid upon the substrate, the velocity of the translation and/or spray, and the spacing between tracks of the pattern can substantially affect the uniformity (or homogeneity) and structure of the chemical and its subsequent analysis.

In some embodiments, the spray pattern can include a meshing pattern of track chemical deposits spaced 1/n apart, where n can equal any integer one or greater. Delayed timing between the deposit of tracks (i.e., rows or columns on substrate 21) can permit previously deposited tracks to dry or evaporate. In some instances, several wide tracks can be deposited and interspersed with smaller tracks therebetween. Tracks can overlap when deposited, can be spaced apart, or any combination thereof. The velocity of the spray assembly can be adjusted during and/or between track deposition. Sensors 99 can be employed to automatically or manually adjust track deposition as desired.

In some embodiments, nozzle 151 of the sprayer can be designed as a "spray tool" that cooperates with a tool charger, such as those available on devices from CTC Analytics (Zwingen, Switzerland). For example, in some embodiments, the spray nozzle can be used as a tool on a CTC PAL3 System. Particularly, the system can include a flow control station useful for migrating with a 3$^{rd}$ party platform. The flow control station can comprise the controls needed for the system, provided in a box or other contained unit that the user can easily interface with. In some embodiments, the spray nozzle can be connected on one side of the flow control station, and the electronic controls of a 3$^{rd}$ party robot can be connected on an opposite side of the station. In some embodiments, the flow control station can include electronic monitoring and adjustment of the flow rate of the gas, providing increased reproducibility of the results and increased control of the liquid flow.

Figure 6A:
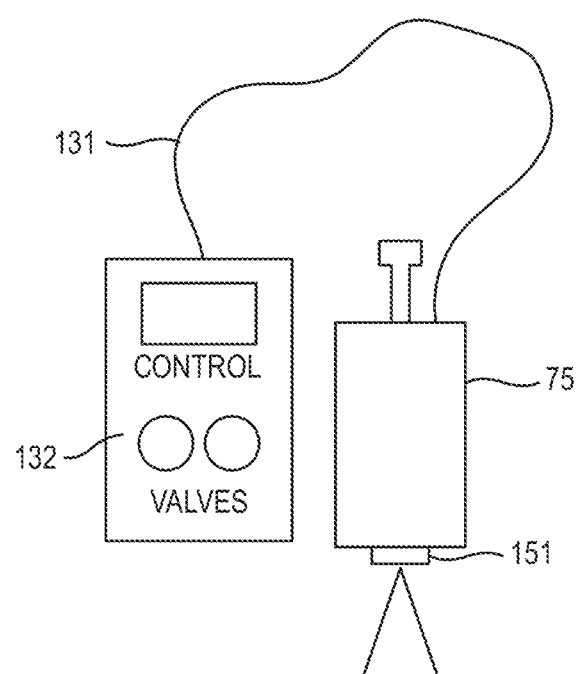
FIG. 6*a* is a front view of one embodiment of a spray nozzle.

Thus, nozzle 151 can be used with the robotic arm of a 3$^{rd}$ party system. In these embodiments, at least a portion of the spray nozzle functionality (24V power, RTD temperature measurement, liquid and gas connection, etc.) can be achieved through connections made on the robotic arm (e.g., electrical and gas). As shown in FIG. 6a, other elements of the spray nozzle functionality can be provided through permanent flexible harness 131. Control module 132 can be used to connect to the harness and provide liquid flow control (including valve switches), pressure control, up/down adjustment, open/close adjustment, and the like. In this way, the flow of gas (e.g., nitrogen), exhaust, liquid, or power can be modulated as desired by the user.

In some embodiments, the spray nozzle can be mounted on a sample preparation/handling platform, such as a CTC PAC system, using generic tool charger 134. For example, the tool charger can have a length of about 55-165 mm. In some embodiments, nozzle 151 can be constructed from an inert, high temperature material (such as aluminum, ULTEM®, polymer, and/or ceramic material).

Figure 6B:
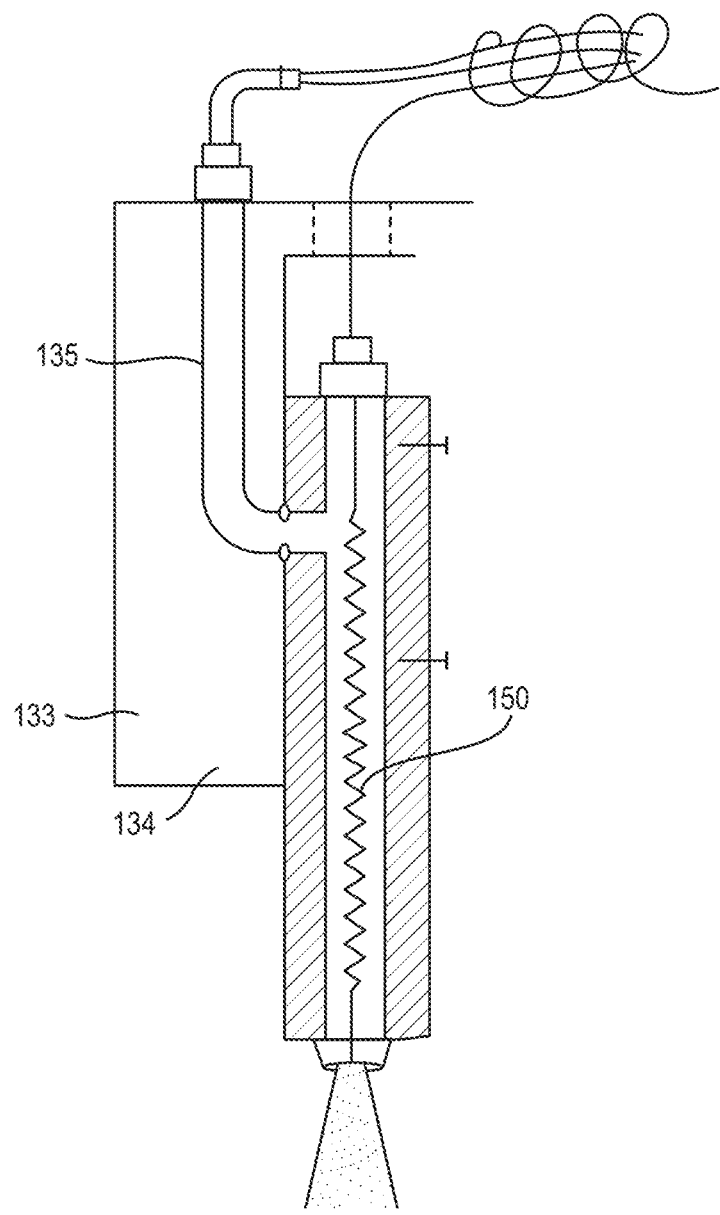
FIG. 6*b* is a front view of one embodiment of a Flow Control Station comprising a nozzle cavity and capillary.

As shown in FIG. 6b, heated gas (e.g., nitrogen) generated by the control module flows through the nozzle cavity and heats capillary 150. In these embodiments, a heater cartridge is not needed in the nozzle, resulting in a simple and robust nozzle design. Advantageously, the nozzle is easy to replace as a module, as 2 or 4 screws can hold the nozzle against a support element, such as bracket 133. The gas connection to nozzle 151 does not require an attachment. Rather, a flat seal between gas channel 135 inside the bracket and an opening on the nozzle body can be used.

Figure 6C:
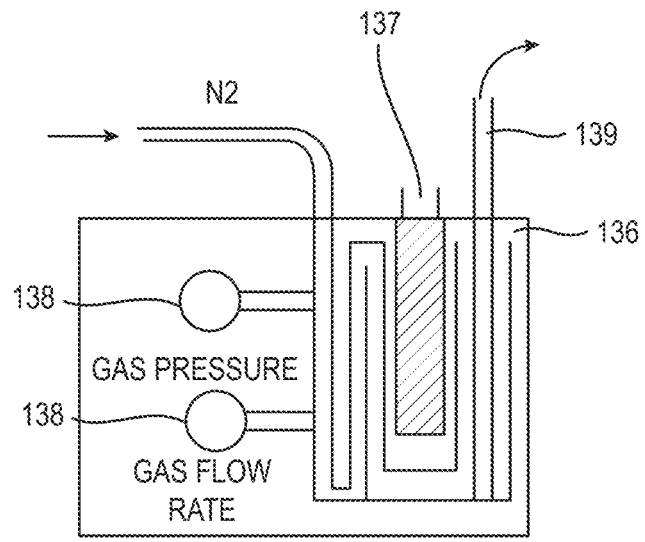
FIG. 6*c* is a front view of one embodiment of a Flow Control Station comprising a gas flow control element.

In some embodiments, the flow control station comprises a gas flow control element as set forth in FIG. 6c. Particularly, gas (such as nitrogen) at ambient temperature enters gas flow control element 136 and travels along a serpentine or coiled pathway adjacent to heater cartridge 137 to create a heat exchanger. As a result, heated gas exits the gas flow element at exit 139. The gas pressure and gas flow rate can be monitored and/or controlled as shown by gauges 138 in FIG. 6c.

In some embodiments, an algorithm can be used to allow for the automated adjustment of one or more parameters (e.g., gas flow). For example, the gas pressure and/or flow rate (e.g., N$_2$) can be automatically controlled to affect the wetness or dryness of the resultant spray.

Figure 7:
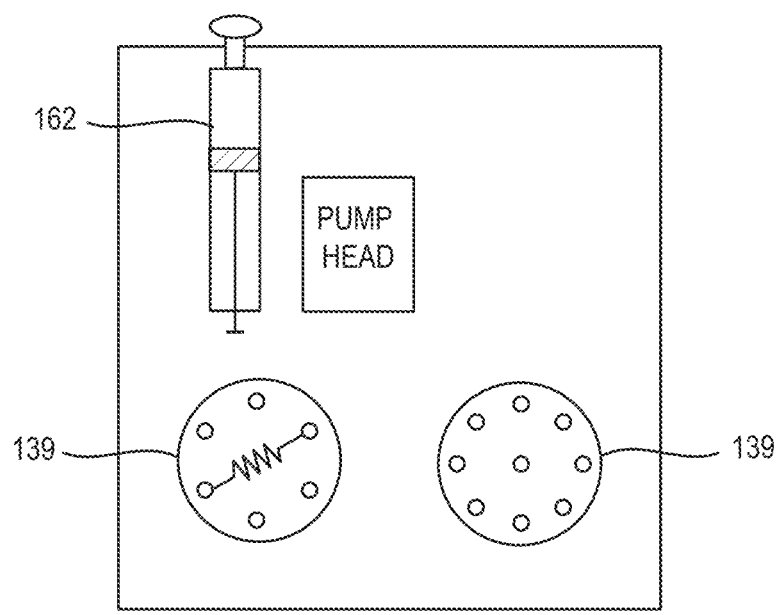
FIG. 7 is a front view of one embodiment of a Flow Control Station comprising a liquid flow control element.

In some embodiments, the Flow Control Station comprises a liquid flow control element, as illustrated in FIG. 7. Particularly, the liquid flow control element comprises single or dual pumps to allow delivery of liquid at a low or high flow rate, as desired by the user. In some embodiments, pump 162 (e.g., a syringe pump) can be used. In some embodiments, the liquid flow control element comprises a sample valve, selector valve, or combinations thereof to allow chemical loading and multiple solvents. Gauges 139 can allow the user to monitor the flow of liquid.

Figure 8:
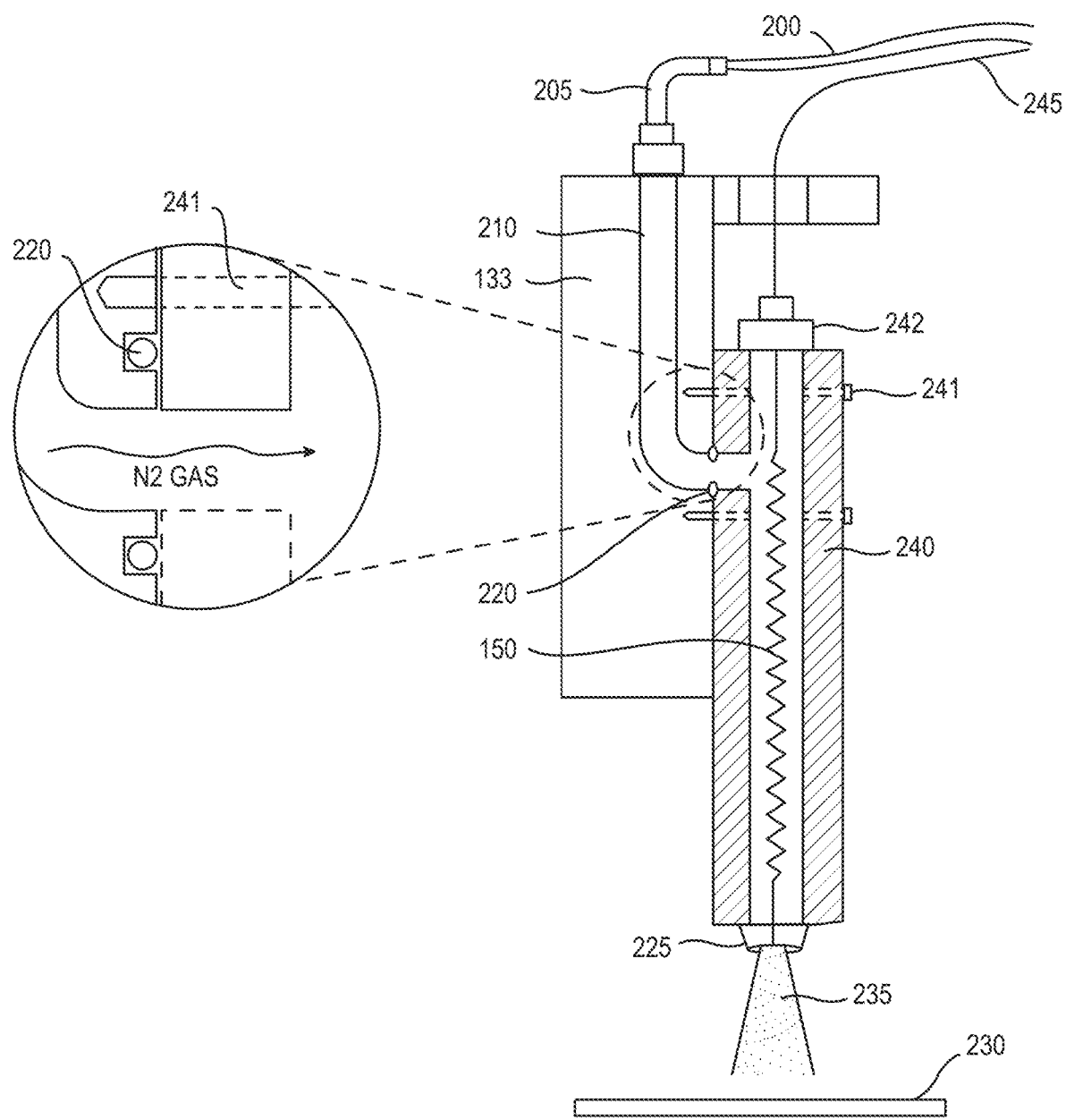
FIG. 8 is a front view of one embodiment of a spray nozzle that can be used with the disclosed system.

In some embodiments, nozzle 151 can be constructed from an inert, high temperature material (such as ULTEM®, polymer, and/or ceramic materials). As shown in FIG. 8, the disclosed system can include a flexible tube 200 for gas transport and connection 205 to allow the gas to enter the system. In some embodiments, connection 205 can be an elbow connection, although any connection can be used. In some embodiments, tube 200 can comprise a diameter of at least about ⅛ inch. Connection 205 allows the gas to enter gas channel 210 configured inside nozzle-holding bracket 133. In some embodiments, gas channel 210 comprises at least one o-ring 220 to seal the gas channel. The inset portion of FIG. 8 illustrates one embodiment of O-ring placement to achieve a seal, and further illustrates that in some embodiments 2 or 4 screws 241 can be used to preserve the O-ring and create a gas-tight seal.

Gas can thus enter the chamber housing capillary 150. The spray nozzle tip 225, substrate surface 230, chemical spray 235, and nozzle body 240 are also illustrated in FIG. 8. In some embodiments, screws 241 can be used to attach the nozzle to a bracket. In some embodiments, the system includes a bulkhead 242 and connector to allow connection with tubing 245 for providing liquid to the capillary. As shown, the bracket is shaped to be compatible with a standard generic tool charger.

Figure 9:
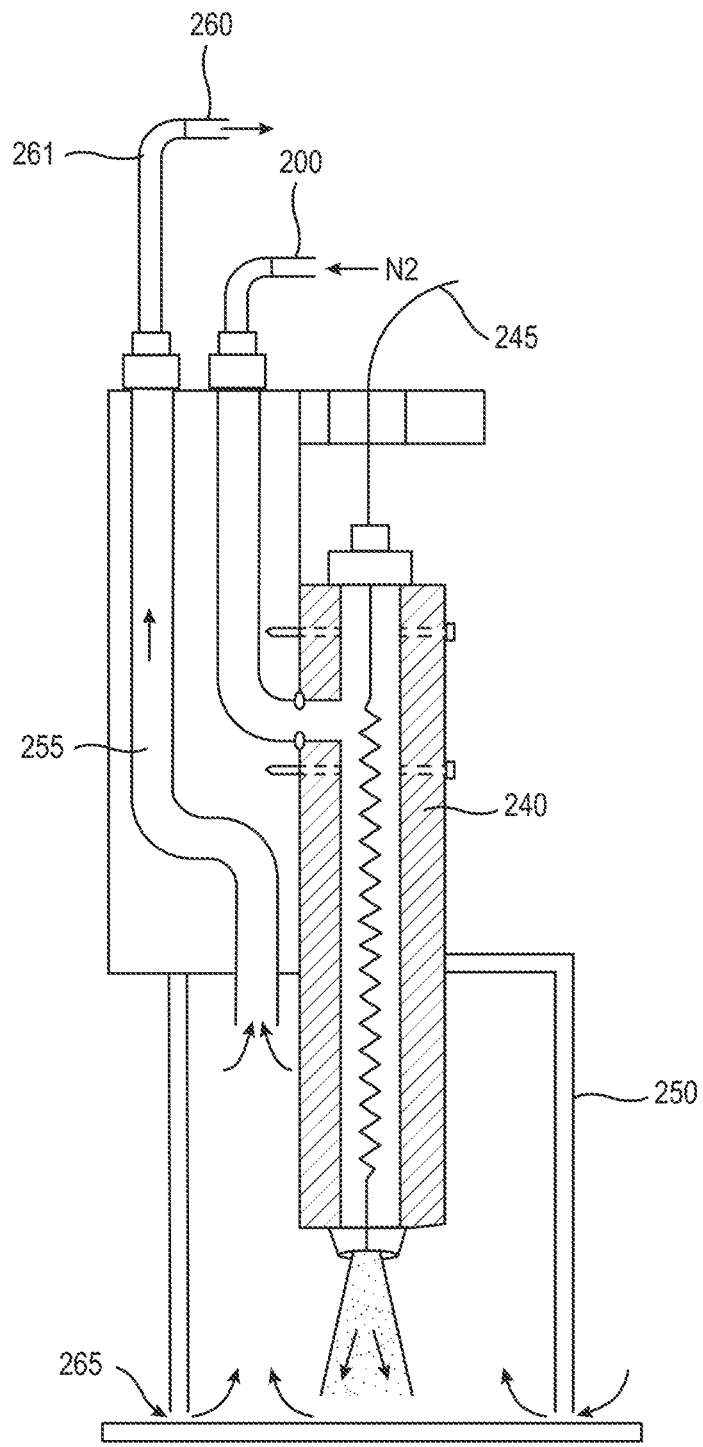
FIG. 9 is a front view of one embodiment of the disclosed sprayer comprising a nozzle with an integrated exhaust.

As shown in FIG. 9, in some embodiments, the system can include a nozzle with an integrated exhaust. Particularly, the system can include a shield/hood 250 configured to prevent unwanted exposure to the chemical spray. In such embodiments, the shield/hood can include exhaust channel 255 that transports spray, gas, and the like from inside the shield/hood through exhaust tube 260 and out of the system. In some embodiments, elbow 261 can join exhaust channel 255 and exhaust tube 260. In some embodiments, the exhaust tube can be longer than tube 200 for gas transport (shown in FIG. 8) such that the exhaust flow rate is greater than the inflow of gas, thereby creating suction at the shield/sample junction 265.

Figures 10A, 10B, 10C:
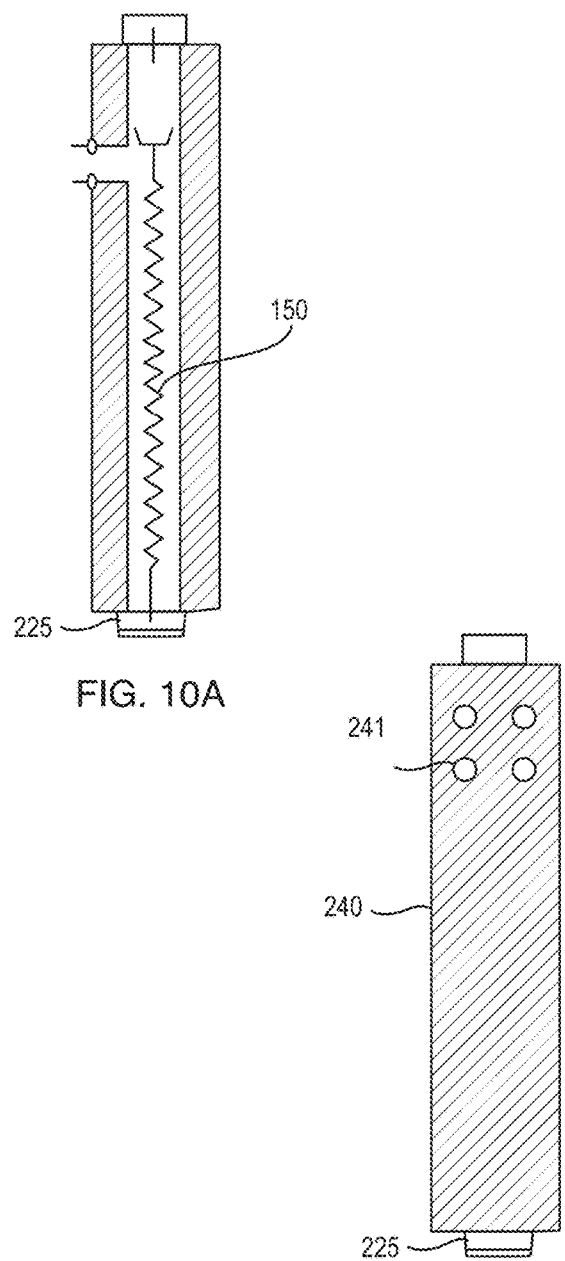

In some embodiments, the nozzle capillary cartridge of the disclosed system can be configured as set forth in FIGS. 10a-10c. Particularly, FIG. 10a illustrates one embodiment of the cartridge, showing capillary 150 and nozzle tip 225. FIGS. 10b and 10c represent the perspectives indicated in FIG. 10a, from the right and left-hand sides, showing screws 241 for fixation into the bracket. FIGS. 10d and 10e represent overhead perspectives, illustrating bulkhead 242.

FIG. 11 illustrates one embodiment of a flow control station, showing controls for the gas flow, liquid flow, and exhaust control. Specifically, FIG. 11 illustrates liquid line 251 leading to a liquid flow control injector valve 252. In some embodiments, the injector valve comprises loops for 6 or 8 ports. The injector valve can be connected to a solvent pump 253. In some embodiments, the liquid flow control further comprises selector valve 266. FIG. 11 further illustrates one embodiment of a gas flow control that cooperates with gas line 270, which in some embodiments comprises a diameter of about ⅛ inch. The gas flow control can comprise a pressure gauge 271, a gas temperature display 272, and/or a flow meter 273. It should be appreciated that any desired displays and/or controls can be included. Exhaust tube 275 can lead to the exhaust control. In some embodiments, the exhaust tube can have a diameter of about ¼ inches. The exhaust control can further comprise controls for the exhaust fan rotation speed 280 and the exhaust on/off control 285. In some embodiments, bracket 286 can be used to attach the flow control station to the system analyzer (e.g., a CTC PAL analyzer).

Figure 12:
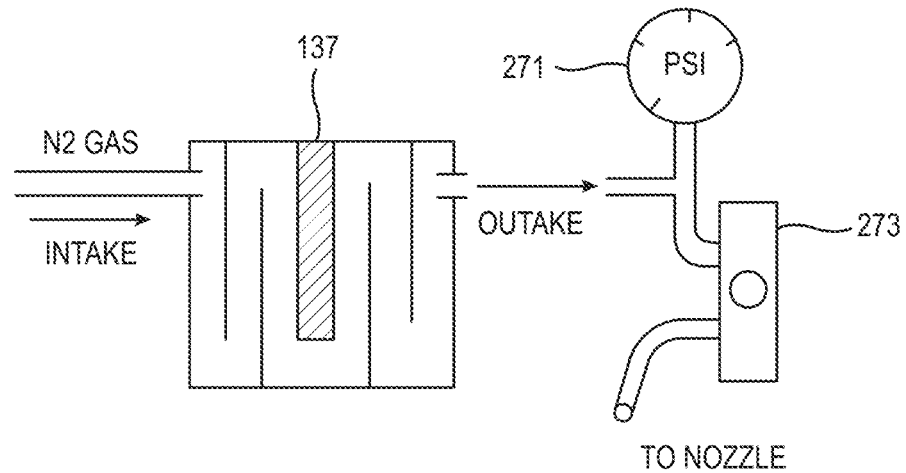
FIG. 12 is a front view of one embodiment of the disclosed flow control station comprising a gas flow control element and a heater cartridge.

A gas flow control element and a heater cartridge are shown in FIG. 12. Particularly, gas enters the system at the intake area and can flow in a serpentine pattern around heater cartridge 137 to heat the gas to a desired temperature. The gas then exits through the outtake area and enters the gas flow control (shown in FIG. 11), comprising pressure gauge 271 and flow meter 273. The heated gas can then be routed to the nozzle.

Figure 13:
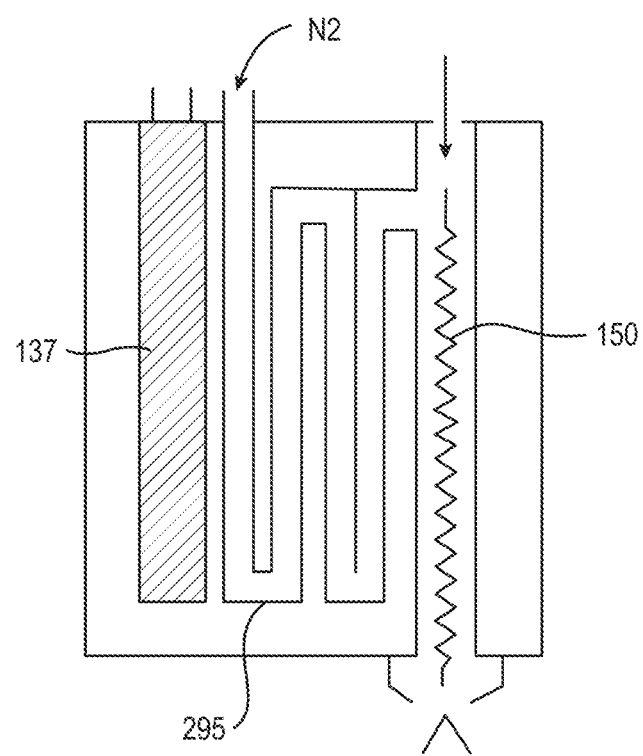
FIG. 13 is a front view of one embodiment of a system comprising a heater cartridge and a heat exchanger.
Figure 14:
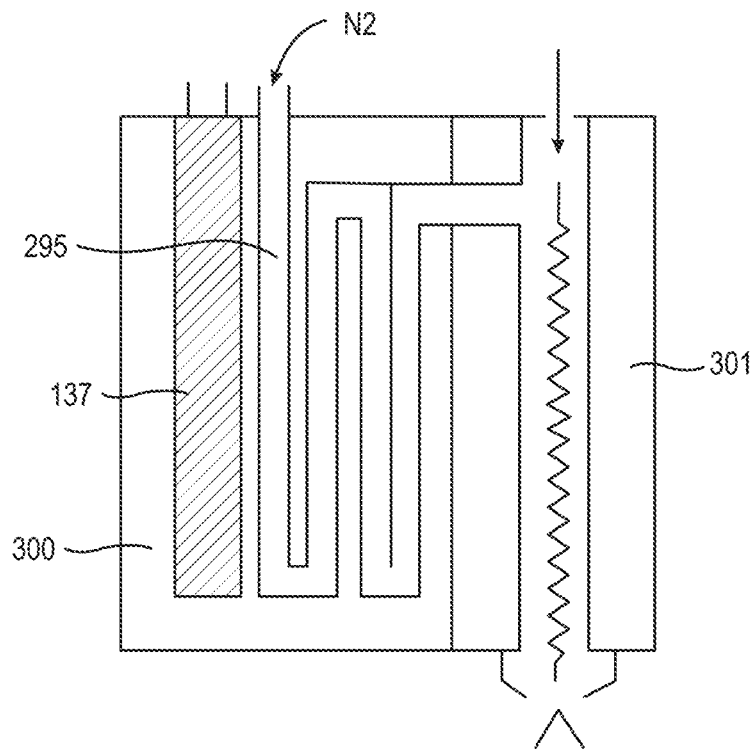
FIG. 14 is a front view of one embodiment of a system comprising a dual-block arrangement.
Figure 17:
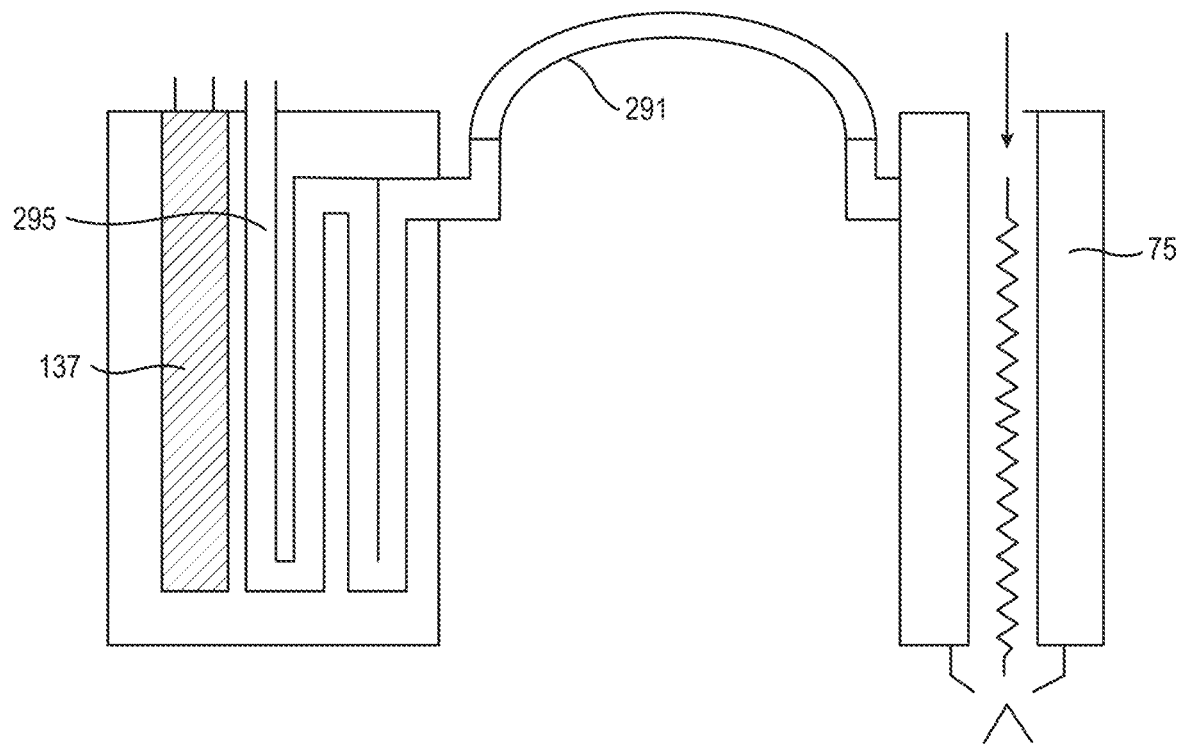
FIG. 17 is a front view of one embodiment of a separated block arrangement of the disclosed system.

Several embodiments of nozzle designs can be optimized for use with the robotic arms described herein. For example, as shown in FIGS. 13, 14, and 17, monoblock, dual-block, and separated block arrangements can be used. In the monoblock nozzle arrangement of FIG. 13, the system comprises heater cartridge 137 and heat exchanger 295. In use, gas (such as nitrogen) travels through heat exchanger 295 to be heated. The heated gas can then enter the nozzle to contact capillary 150, as shown. In a monoblock arrangement, the heater cartridge, heat exchanger, and capillary are all housed within a single unit.

A dual-block arrangement is illustrated in FIG. 14. Particularly, two blocks are positioned in an adjoining spatial relationship. The dual block system can comprise a first block 300 comprising a heater cartridge 137 and/or a heat exchanger. Second block 301 can comprise a nozzle and capillary. In use, gas enters first block 300 and travels through the heat exchanger 295 to be heated by cartridge 290. The heated gas can then enter second block 301 to contact the spray nozzle and capillary.

Figure 15:
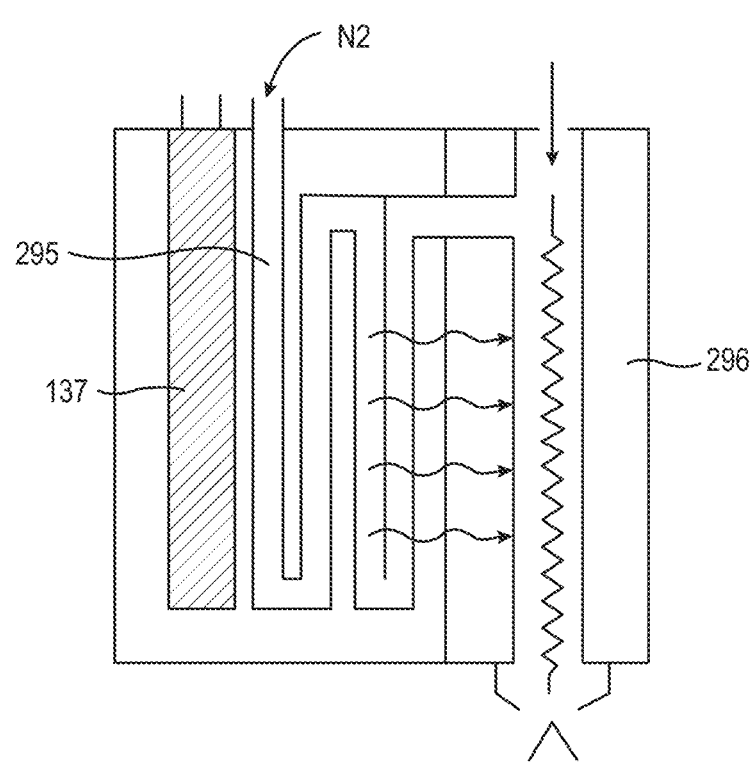
FIG. 15 is a front view of one embodiment of a conductive version of a capillary block of the disclosed system.
Figure 16:
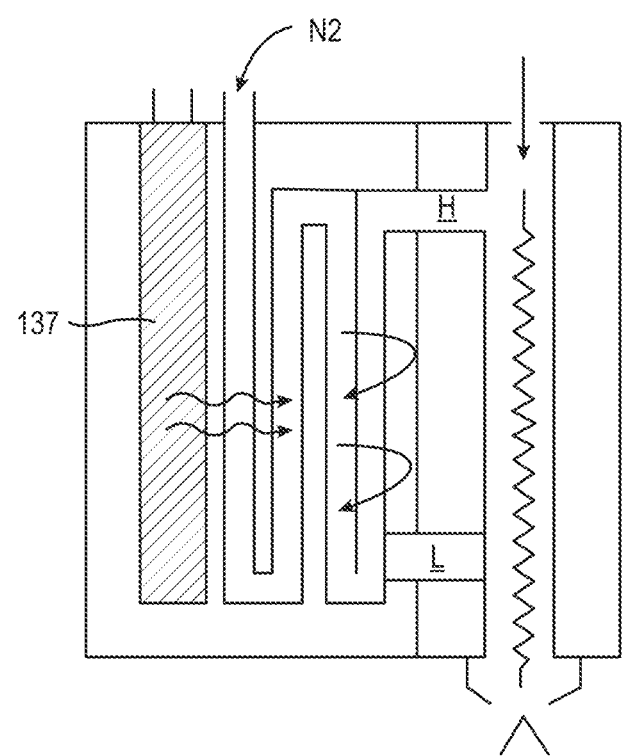
FIG. 16 is a front view of one embodiment of an insulated version of a capillary block of the disclosed system.

In a dual block design, the heater cartridge and heat exchanger components can be included in a conductive metal block, thereby providing temperature control of the propulsion gas (e.g., nitrogen and/or other inert gases). The capillary and nozzle tip can be included in a conductive or insulative block in some embodiments, as shown in FIGS. 15 and 16. Particularly, FIG. 15 illustrates one embodiment of a conductive version of a capillary block. Heat from a heater cartridge 137 heats the propulsion gas through heat exchanger 295, and also radiates to capillary block body 296 constructed from heat conductive material (e.g., aluminum) as indicated by the arrows. The capillary block is constructed from conductive materials and thus is heated by the heated gas and the heated body. In such embodiments, the gas temperature and the capillary (liquid) temperature are equalized. In the embodiment of FIG. 15, a conductive version of the capillary block is therefore shown.

FIG. 16 illustrates one embodiment of an insulated version of a capillary block. Particularly, in the insulative system, heat from cartridge 137 heats the gas through a heat exchanger, but the radiative heat does not travel to the capillary. Rather, the capillary is heated by the warm gas. By adjusting the position of the gas entry, it is expected that the temperatures of the gas and liquid could be different. For example, a high entry point (H) provides a warmer liquid, and a low entry point (L) provides a cooler liquid compared to the gas.

One embodiment of a separated block arrangement is illustrated in FIG. 17. Particularly, in a separated block arrangement, a first block comprising heater cartridge 137 and heat exchanger 295 is separated from a second block comprising a nozzle and a capillary. In use, gas enters the first block and travels through heat exchanger 295 to be heated by cartridge 137. The heated gas can then travel through insulated tubing 291 to enter the second block to contact the spray nozzle and capillary.

Figure 18:
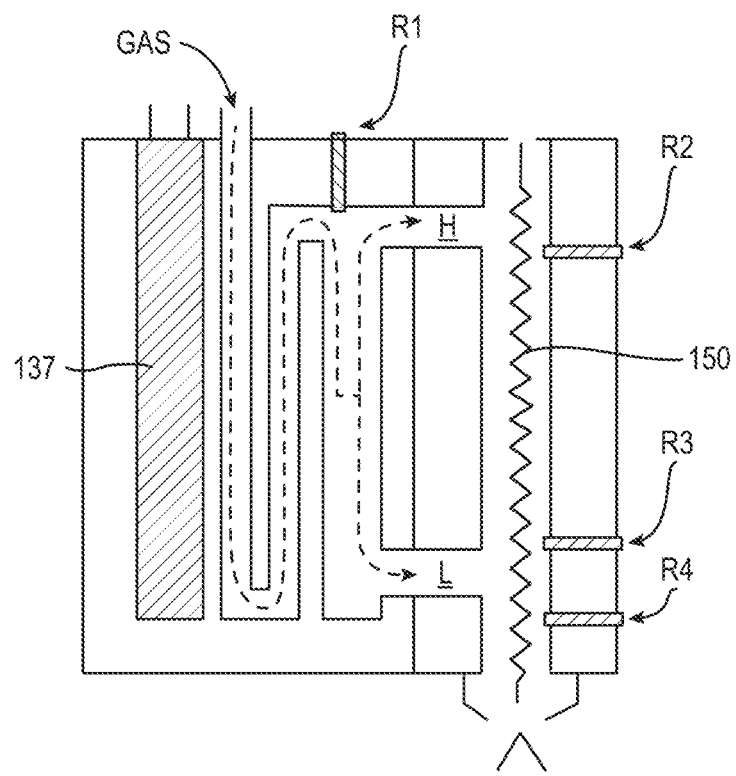
FIG. 18 is a front view of one embodiment of a dual temperature, dual block nozzle design.

FIG. 18 illustrates one embodiment of a dual temperature, dual block nozzle design. As shown, a thermocouple or RTD temperature sensor can be positioned at various locations ($R_1$, $R_2$, $R_3$, $R_4$) in the system. For example, $R_1$ can measure heater block temperature, $R_2$ can measure the temperature of the capillary entry point, $R_3$ can measure the capillary temperature near the exit, and $R_4$ can measure the capillary temperature adjacent to the exit. Varying the cartridge temperature, flow rate of gas, entry location of the gas, and the flow rate of liquid through the capillary can validate the conditions most favorable for slow or rapid evaporation, and/or for the creation of small or larger liquid droplets. For example, with a low gas entry point (L), a temperature profile of about $R_1$=90° C., $R_2$=25° C., $R_3$=40° C., and $R_4$=80° C. is believed to be achieved. The difference between $R_3$ and $R_4$ is believed to be a key factor in controlling evaporation rate and droplet size, which are key to the formation of matrix crystals in MALDI experiments.

Further, it is known that chemical spray deposition is affected by several factors. For example, qualitative factors include amount of chemical deposited and resulting surface density. Qualitative factors include wet or dry spray quality, temperature of the spray, speed of drying, amount of layer overlapping. A series of controls can be implemented on a chemical sprayer, such as the HTX sprayer:

Calculation of Linear Flow Rate=LFR=FR/V

FR=flow rate of solvent pump

V=velocity of nozzle head

Low value of LFR=dry spray

High value of LFR=wet spray

Visualization of LFR for user on the interface (with optionally a colored background):

Linear Flow Rate=0.020

Rate (mL/mm).

In some embodiments, the color of the background can change with the value of the ratios. For example, LFR>Value 1=Wet Spray=Blue Color Value 1>LFR>Value 2=Dry Spray=Green Color LFR<Value 2=Super Dry Spray=Yellow Color.

Figure 19A:
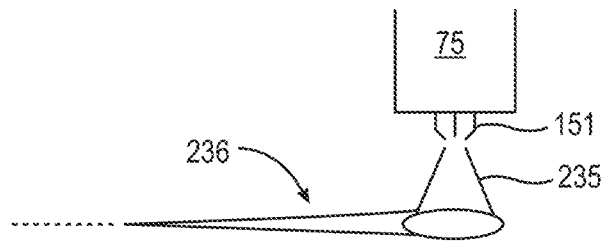
FIG. 19*a* is a front view illustrating the optical measure of the length of the wet surface behind the spray head in accordance with some embodiments of the presently disclosed subject matter.
Figure 19B:
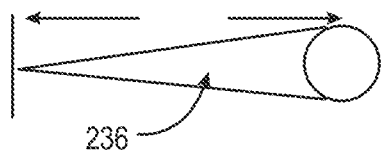

Optionally, in some embodiments, the optical measure of the length of the wet surface behind the spray head can be measured (also known as the "snail trail" or "comet trail" (CT)), as shown in FIG. 19a. Particularly, the arrow illustrates the direction of sprayer movement. Spray 235 is ejected from nozzle 151 and leaves behind wet trail 236, which can be referred to as a "snail trail" or a "comet tail." A long trail 236 is indicative of a wet spray, and a short trail is indicative of a dry spray. FIG. 19b is an overhead view of trail 236.

Figure 20:
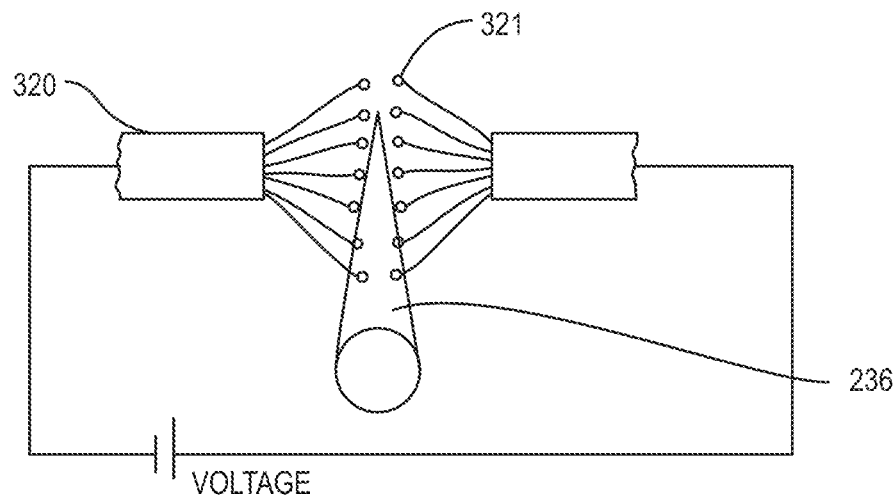

In some embodiments, the system can include an electrical sensor able to measure the length of the trail or provide a signal proportional to the trail. For example, FIG. 20 illustrates one embodiment of an electrical sensor comprising multiple strands of wire 320, each include at least one electrical end point 321. The sensor is configured such that the more end points are connected, the longer trail 236 is. The trail is humid and creates a conductive path between the end points. An ohm meter provides a reading proportional to the trail length.

Figure 21:
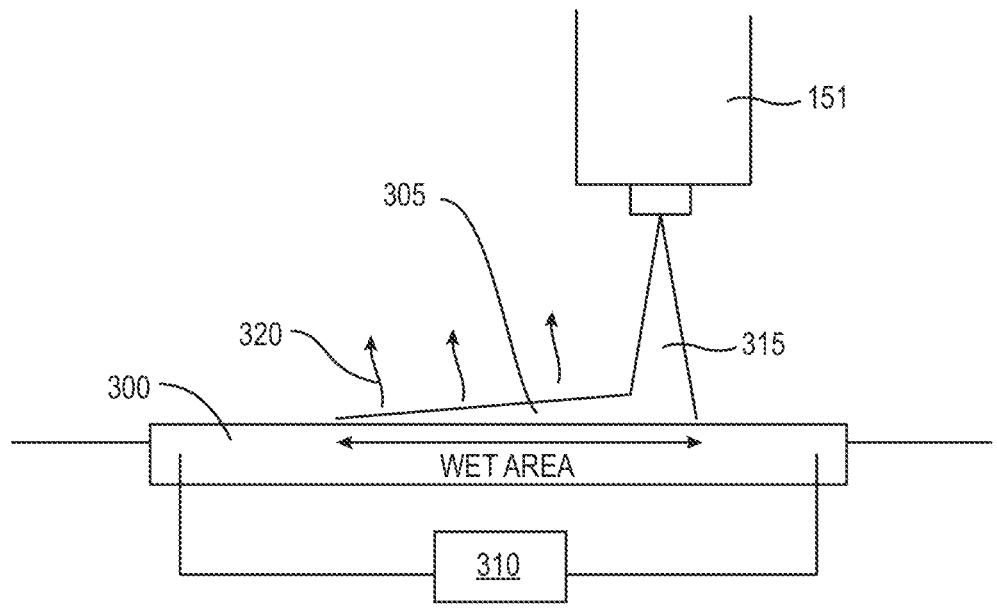

As illustrated in FIG. 21, in some embodiments, the disclosed system can include sensor plate 300 comprising an electrically conductive surface of a known resistivity, as measured by ohm-meter 310. During the spray tuning phase, the disclosed spray assembly can move nozzle 151 over the sensor surface from one end to another. Spray cone 315 comprises liquid droplets and gas, as shown. As a result, a wet film is deposited on the sensor surface (e.g., visible as comet tail 305) and the conductivity of the sensor surface is thereby altered. The conductivity remains altered until the test spray has fully dried (e.g., through evaporation 320). Thus, a measure of conductivity increase (e.g., resistance drop) correlates to how wet the spray is. Further, a measure of the time for the conductivity to return to normal correlates to the drying time of the spray.

Thus, as a wet and hence conductive test spray travels over the conductive surface of the sensor, the resistance is decreased as measured by ohm-meter 310. As the spray dries, the resistance returns to normal. The quantification of the resistance drop and time to return to normal provide an estimation of the spray wetness. Particularly, a wetter spray creates a bigger drop, and a slower drying spray creates a longer time to return to normal. Such values can be correlated to a database of resistance drop and time values corresponding to sprays of known characteristics for multiple solvents and offer a meaningful way to test the spray quality.

Figure 22:
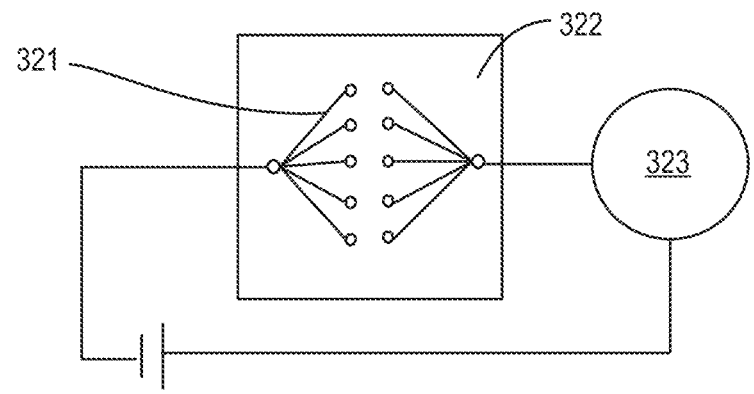

In some embodiments, instead of using a multi-strand wire as shown in FIG. 20, the electrical sensor can comprise printed circuit 322 as illustrated in FIG. 22. FIG. 22 further illustrates ohm meter 323.

Figure 23:
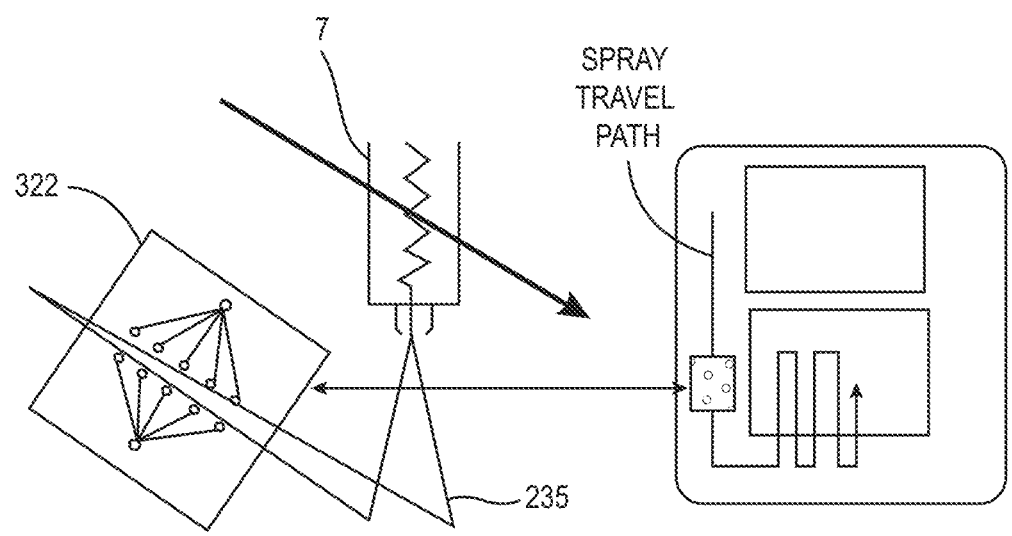

The printed circuit can be integrated in the sample holder of the sprayer, allowing the setup of a measurement routine prior to spraying or in between successive layers to ensure that spraying is constant, as shown in FIG. 23. The nozzle moves across the printed circuit, centered on the electrical end points.

Figure 24:
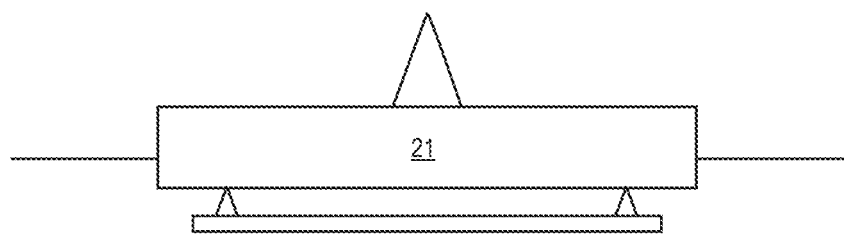

In some embodiments, the electrical sensor uses weight change as a measure of evaporation end amount deposited, as illustrated in FIG. 24. $W_1$ is the weight of substrate 21 (e.g., glass slide) before deposition (tare); $W_2$ is the weight of the glass slide+matrix+solvent; $W_3$ is the weight of the glass slide+matrix (solvent has evaporated).

The matrix density can be calculated by:

$(W_2-W_1)/$(surface covered)=mg/mm$^2$.

The matrix deposition rate (MDR) can be calculated by:

$\alpha \approx MDR=(W_3-W_1)/(t_2-t_1)$=mg/min (relates to deposition rate).

$\beta \approx$Evaporation Rate=$(W_3-W_2)/(t_2-t_1)$=mg/min (relates to how fast solvent evaporates).

In some embodiments, the software controlling the Flow Control Station can include a spray auto-tuning function whereby output from a calculation or from an optical/electrical sensor assessing the dryness of the spray can be used to measure deviation to a "dryness" set point. The spray auto-tuning function can then adjust the flows and temperature controlled by the Flow Control Station to tune the spray. Such a functionality would be especially useful to keep the process reproducible even with external factors, such as changing spray nozzle head and/or increased ambient air moisture level.

In some embodiments, the flow control station can comprise a UV detector. In some embodiments of the flow control station, a pump head, a venting port with pressure detector, a BPR cartridge, a 6-port or 8-port valve, and/or a UV detector can be assembled into a single housing. The pump head provides a steady flow, the pressure sensor provides input to the software to ensure steady conditions, the BPR maintain adequate pressure on the pump head, the 6-port or 8-port valve enables the injection of a chemical into the flow line via a sample loop, and the UV detector (optional) can be used to detect the change from wash solvent to a particular chemical.

Figure 25A:
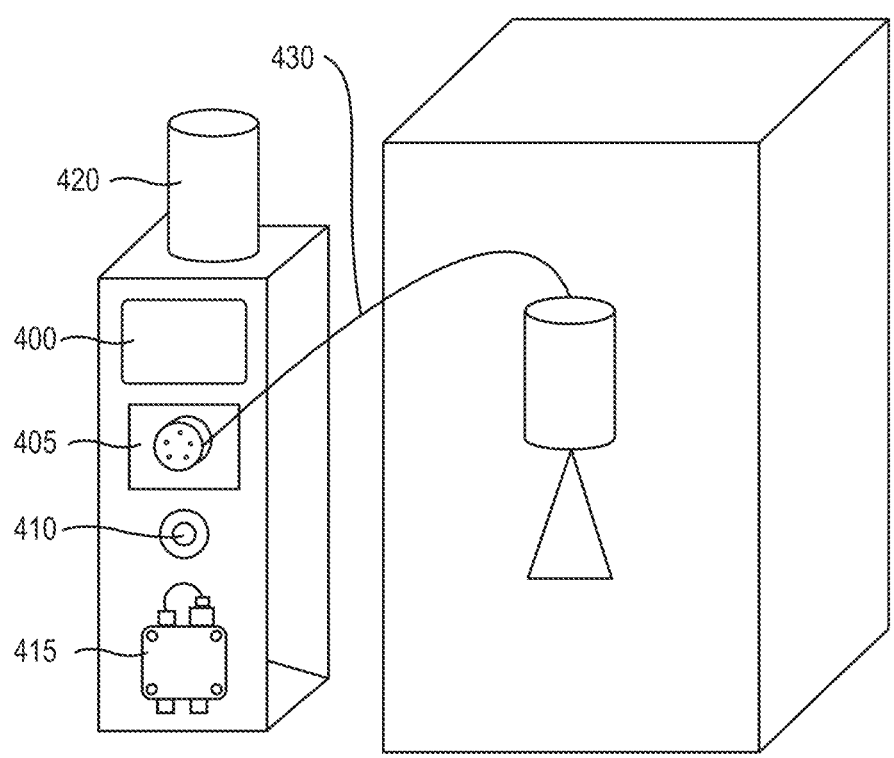
Figure 25B:
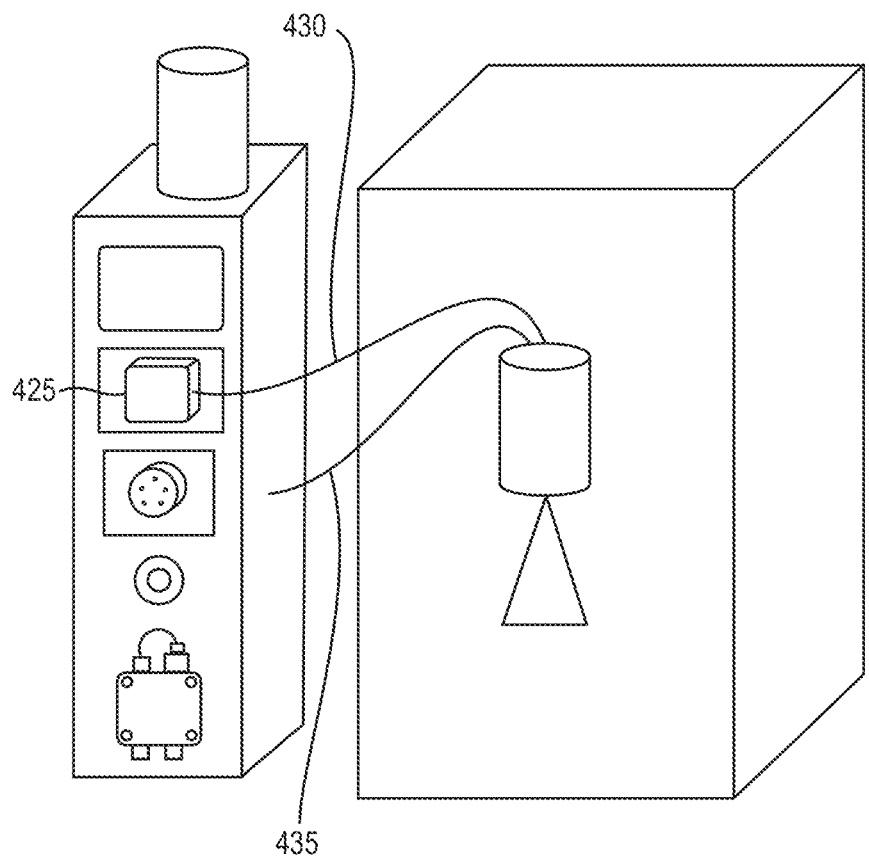

FIGS. 25a and 25b illustrate two layouts of a solvent delivery module comprising display 400, 6-part and 2-position valve 405, venting/priming 410, pump head 415, solvent container 420, UV or IR detector 425, solvent line 430, and gas line 435. The pump can pump 0.001 to 0.5 mL/min in some embodiments.

Figure 26A:
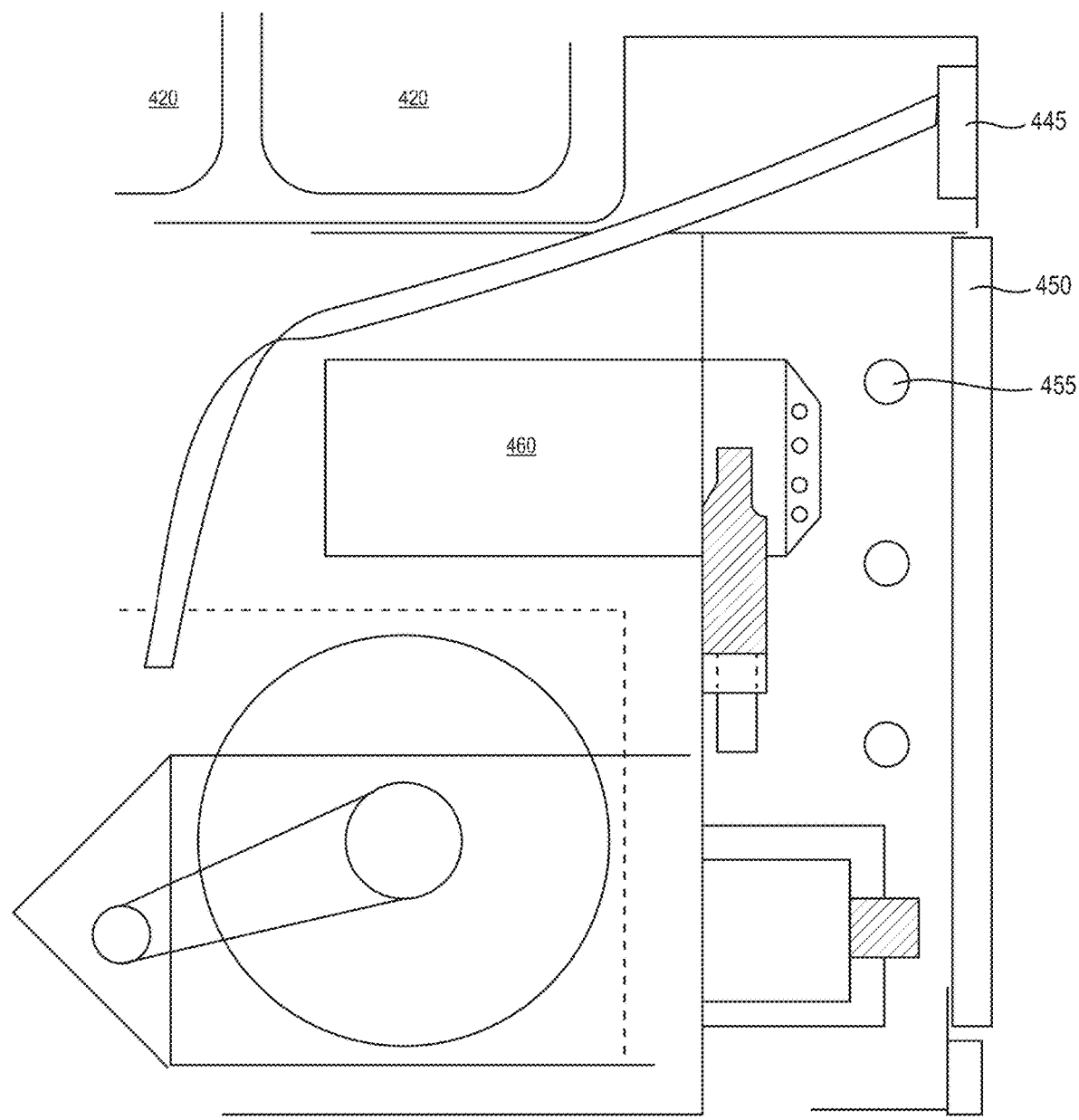
Figure 26B:
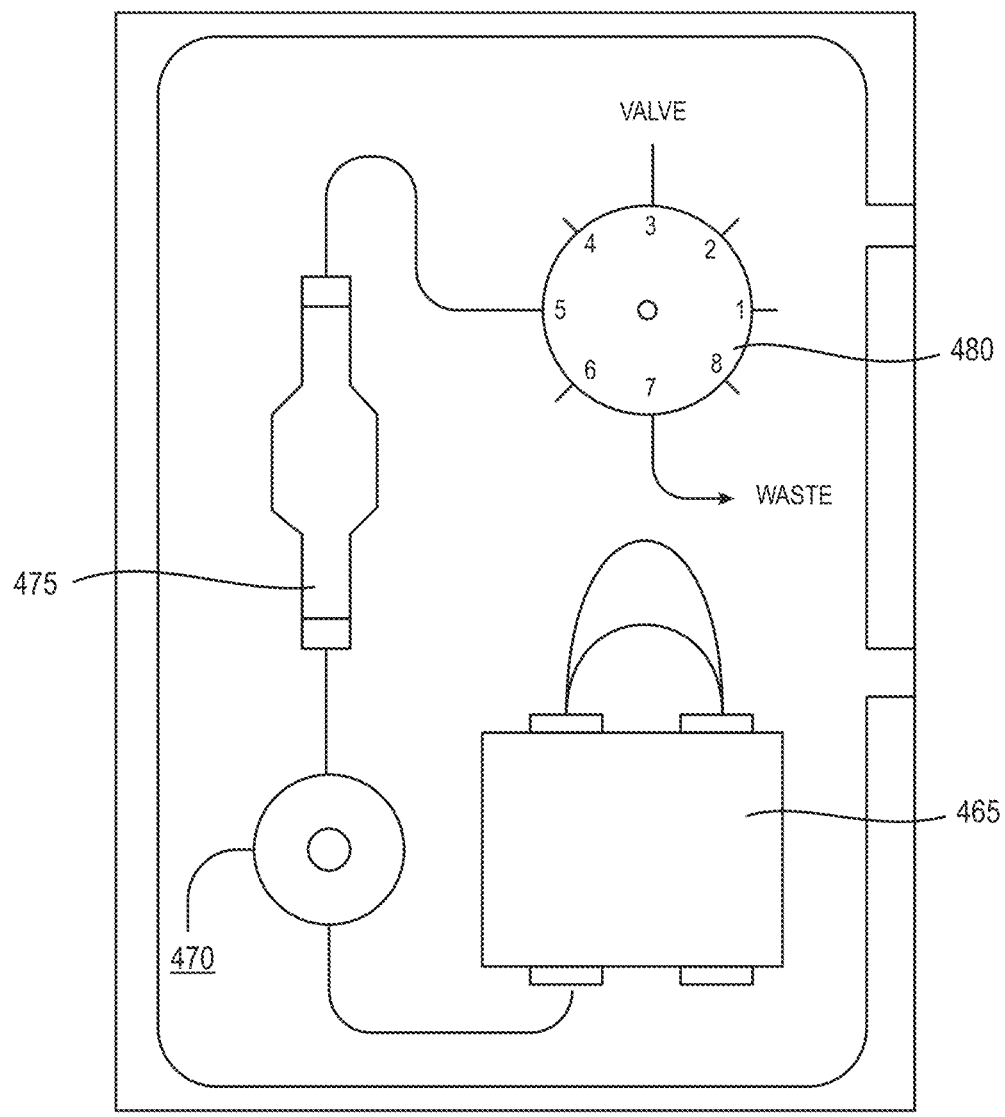

FIGS. 26a and 26b illustrate side and front views, respectively, of one embodiment of a solvent delivery module. Solvent containers 420, display with label 445, glass 450, through holes 455, valve drive 460, pump head 465, pressure sensor 470, BPR 500 RPM 475, 6- or 8-port valve (motorized) or universal valve 480 are shown.

Figure 27:
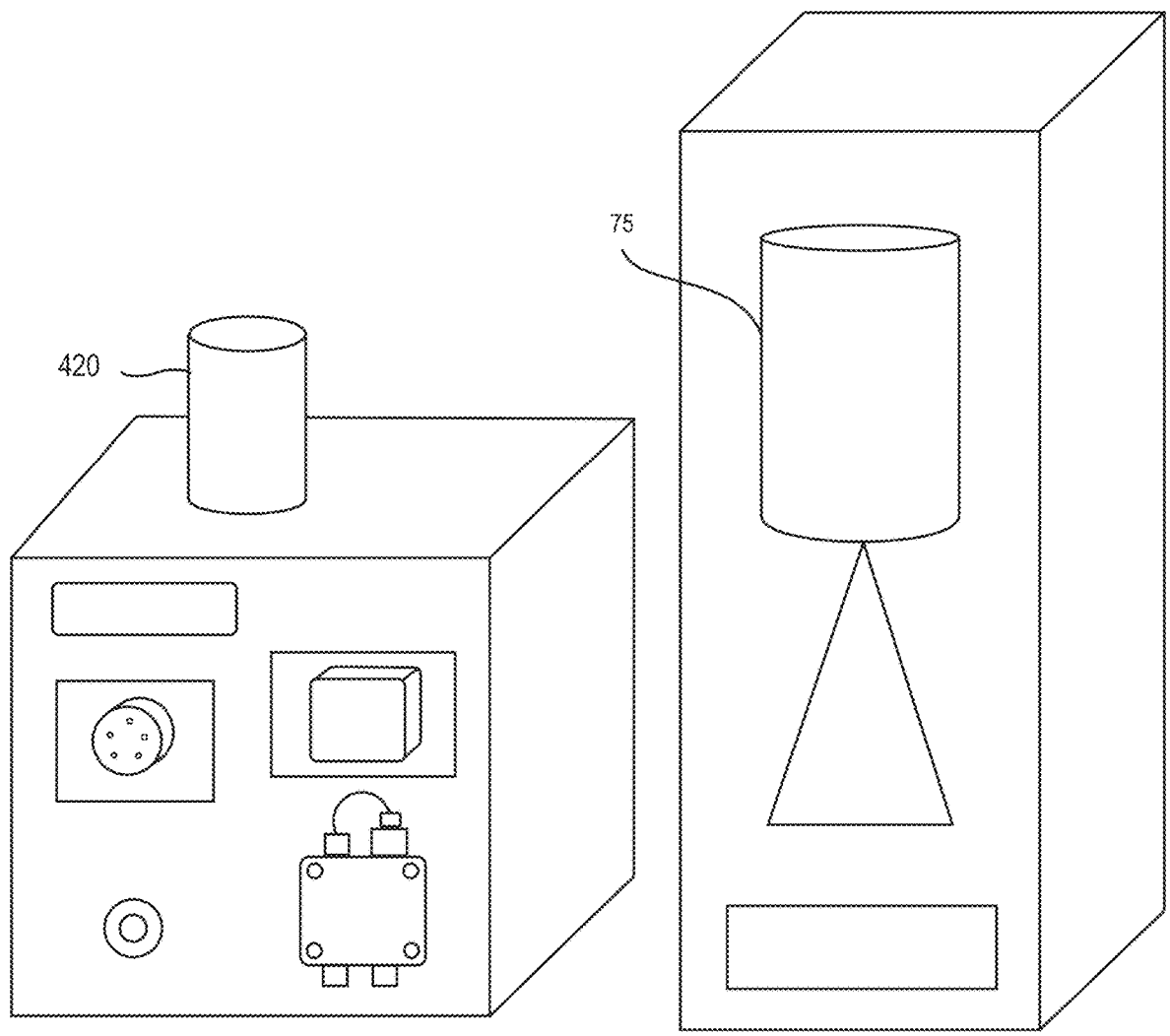

FIG. 27 illustrates one embodiment of a proposed layout of a Solvent Delivery Module, with the arrows indicating the flow from solvent 420 to sprayer 75.

The disclosed system provides novel spray patterns for more homogenous deposition (smoother peaks and valleys). For example, in some embodiments, the system can produce a meshing pattern by using fractional deposition offsets at 1/n track spacing with alternate rotations (e.g., using deposition at ½, ⅓, ¼, ¾, and ⅔ track spacing). Combinations of wide track spacing (>8 mm) and fractional deposition offsets can be produced to maximize the time between overlapping tracks (e.g., track spacing of 20 mm and offsets of 0, 5, 10 and 15 mm for a total of 4 non-overlapping passes).

In some embodiments, the novel spray patterns can eliminate long side/short side bias. Particularly, the system can provide for automatic expansion of spray area from rectangle to square, diagonal pattern to cover rectangles, and/or Swiss Cross spray pattern providing overspray only along the spray length (not width) to reduce chemical consumption. The system further provides for automatic calculation of wait time (algorithm) at the end of the track to equalize travel time in both directions. In some embodiments, a sensor can be used to measure the spray evaporation speed. Snail trail length, visualization of shine on spray, and heat loss from evaporation speed can also be measured. The data can be used to guarantee process stability for multiple sample types and sizes. In some embodiments, sensors can be used to measure the gas and/or fluid pressure variation during spray sequences.

The disclosed system further provides for an increased stage velocity so higher flow rates can be used. In some embodiments, the increased stage velocity can be at least about 5,600 mm/min. For small spray areas (where spray returns sooner to the same location) a higher stage velocity can be used in conjunction with a set wait time. To this end, the wait time can automatically be calculated, such as through the use of an algorithm to keep the dry/wet effect the same regardless of sample area size and shape. Track spacing can be increased from the typical 1 to 3 mm to more than spray width (varies from 5 to 10 mm) so that spray does not overlap. Homogeneous coating can therefore be achieved by using track spacing in conjunction with novel spray meshing patterns. In some embodiments, optimum flow rate, patterns, velocity and wait times can automatically be calculated for the same wetness or dryness (e.g., using an algorithm).

Particularly, the presently disclosed system enables reproducible and constant spray quality, including wet/dry characteristics. Several parameters affect wetness/dryness of the spray, as set forth below in Table 1. "Parameter" refers to the parameter having an effect on the wet/dry characteristics of the spray. "Result" refers to the effect exhibited on the spray when the parameter is increased. "Control" refers to the manner in which the parameter can be controlled.

TABLE 1

| Wet/Dry Parameters | | | |
|---|---|---|---|
| Parameter | Unit | Result | Control |
| Nozzle velocity | mm/min | Drier | Motor speed |
| Liquid flow rate | mL/min | Wetter | Pump flow |
| Nozzle temp. | ° C. | Drier | Heater cartridge/Temp. sensor |
| Drying gas ($N_2$) flow rate | L/min | Drier | Digital flow |
| Humidity in chamber | % moisture | Wetter | Humidifier |
| Tray temp. | ° C. | Drier | Heater film/Temp. sensor |

An algorithm can therefore function to move the nozzle over a sensor surface and obtain a measure of wetness. If the wetness value is inside a set range, the value can be saved and a sample run. If the wetness value is below a set range (too dry) or above a set range (too wet), one or more parameters (e.g., from Table 1) can be adjusted to produce a wetter or drier spray. For example, if the wetness value is too dry, the nozzle speed can be decreased, liquid flow rate can be increased, and/or gas flow rate can be decreased to produce a wetter spray. Similarly, if the wetness value is too wet, the nozzle speed can be increased, liquid flow rate can be decreased, and/or gas flow rate can be increased to produce a drier spray. The spray can then stabilize, travel over sensor surface, and a new measure of wetness can be taken.

Accordingly, the wetness/dryness of the spray can be controlled with gas flow (e.g., $N_2$) and/or temperature. Advantageously, the gas flow and temperature do not affect the quantity of matrix deposited (they are not included in the formula for calculating matrix density). Therefore, they can be changed to affect dryness without affecting quantity, providing a robust way to control the spray quality.

In some embodiments, the chemical solution pressure can be controlled to allow high nozzle temperatures to be used. Particularly, if the pressure is increased inside the capillary, nozzle can be at higher temperature than ambient pressure boiling point. Instability (puffing issues) can be controlled with solvent degassing. Further, pressure regulators on the solvent line can be used. A longer or lower ID capillary can be used to create a higher pressure inside the nozzle head.

The spray chamber pressure can be controlled to allow for faster evaporation rates. For example, a vacuum pump connected to the chamber can be used to create a low-pressure atmosphere above the sample. A high velocity fan can be used to vent the chamber and thus create a lower pressure. Other methods of decreasing pressure by fast draft can also be provided.

In some embodiments, the sample temperature can be controlled to counteract sample surface cooling. Particularly, the spray chamber temperature can be controlled by an auxiliary heater positioned inside the chamber. A control sample temperature holder (heated film, peltier, hot water heater) can be used to compensate for evaporative cooling. In some embodiments, a sample can be warmed above ambient temperature to accelerate evaporation. A warming lamp (infrared or other light energy) can be installed to keep the sample surface warm or to further accelerate drying. A measure of current intensity (Amps) can be used to calculate the cooling rate induced by evaporative cooling.

The system provides for the use of the above aspects to increase drying speed and allow use of more environmentally friendly solvent solutions (e.g., the use of 50% water/50% methanol instead of 100% acetone) and obtain the same dry effect and small crystal size.

As discussed herein above in detail, the disclosed system includes a sliding sample tray drawer. The drawer allows visualization of a sample with no viewing angle bias. The drawer further allows for easier positioning, taping of edges, and dismount of the sample compared to prior art methods. The drawer allows for quick and easy sample dismounting and mounting. The drawer further offers a safety advantage by protecting the user from the heated nozzle of the sprayer. In addition, the drawer prevents the user from having to remove a glass panel each time a sample is added or removed. The drawer provides a small instrument footprint (e.g., there is no need to allow room for hands inside the spray assembly). In some embodiments, the drawer can be configured as a dual level sample holder (e.g., a first position for use as an enzyme digest and a second position for chemical deposition).

In some embodiments, the disclosed system includes a humidity chamber that provides a covering for the substrate. The chamber comprises a liquid reservoir and a suspended tray to receive the sample. The chamber thus creates a warm and humid atmosphere optimum to certain in-situ chemical reactions, such enzymatic digestions. The humidity chamber further allows the sample to be rehydrated, such that crystal size can be controlled and/or chemical layer penetration and interaction with the sample can be manipulated.

In some embodiments, the tray can be heated. For example, a heated plate or an external unit can be positioned in the sample drawer to allow removal of low boiling point solvents. In some embodiments, a wax (e.g., 80° C.) plate can be used to remove paraffin from paraffin-embedded tissues.

The disclosed system further provides a novel solvent delivery module. For example, the module allows for automatic dispensing, unattended operation, automated start-up and shut down, and multi-chemical spraying sequences. For example, X passes with solution A can be made, followed by Y passes with solution B. Alternatively, X passes with a chemical can be made, followed by a rehydration step. In some embodiments, a trypsin digestion pass can be made, followed by a chemical deposition.

In some embodiments, the disclosed system can include a dual temperature nozzle sprayer. Particularly, a nozzle with a shorter or longer liquid path (e.g., shorter or longer capillary) combined with a shorter or longer nebulizing gas flow path (e.g., shorter or longer gas flow path) can be used. The nozzle can be constructed from a material customized to increase or decrease the heat exchange between the heater cartridge and the substrate.

The disclosed system can include a sprayer with multiple spray heads or orifices. For example, a nozzle with a secondary spray orifice can be used to deposit a solution that enhances extraction (e.g., MALDI chemical spray followed by chloroform spray to extract lipids preferentially). In some embodiments, a dual spray head with a secondary drying spray (nitrogen flow only) can be used. Multiple spray heads can be used to achieve other combinations of pre and post spray treatments. A spray head with an infrared heater or other energy source capable of accelerating drying or extraction can be used.

In some embodiments, the disclosed sprayer can include a lighter spray nozzle compared with prior art nozzles. For example, the nozzle can be manufactured from a lighter-weight material. Further, a standard aluminum core can be redesigned with increased ribs (i.e., less metal but better heat exchange). Different materials with lower weight and higher heat conductivity can also be used. A lighter weight nozzle allows faster operation of the stage without tasking the motorized XY stage. The lighter weighted nozzle further allows for easier inclusion of the spray technologies on other robotic platforms with a light duty robotics mechanism.

In some embodiments, the disclosed system provides for a smaller sized spray nozzle to allow for a system with a smaller footprint compared to prior art systems. The smaller nozzle is also easy to migrate to other existing robotic platforms (e.g., Tecan workstation, CTC System, etc.).

The solvent lines of the disclosed system can be degassed for a higher temperature operation. For example, once degassed, the solvent in the capillary can be heated above its boiling point without becoming unstable (puffing). Accordingly, a degasser can be included in the liquid flow path. In some embodiments, a chemical can be filtered through a high back pressure frit to decrease dissolved gases. The system can include a pumping mechanism configured to degas the solvent as it flows. Further aspects can include purging at a high flow rate and constant flow at a very low flow for a set time (e.g., overnight) to keep the system pressurized.

As described herein above, the disclosed system can include a flow control station. The spray nozzle can be designed as a spray tool that cooperates with a tool charger. The system can further include a flow control station useful for migrating with a 3rd party platform. The flow control station can comprise the controls needed for the system. In some embodiments, the spray nozzle can be connected on one side of the flow control station, and the electronic controls of a 3rd party robot can be connected on an opposite side of the station. At least some of the spray nozzle functionality (24V power, RTD temperature measurement, liquid and gas connection, etc.) can be achieved through connections made on a robotic arm (electrical and gas). Other elements of the spray nozzle functionality can be provided through a permanent flexible harness. In some embodiments, the system can be configured such that a heater cartridge is not required in the nozzle, resulting in a simple and robust nozzle design. Further, the nozzle can be easy to replace as a module.

The Flow Control Station can comprise a gas flow control element. Particularly, gas at ambient temperature enters the gas flow control element and travels along a serpentine or coiled pathway adjacent to a heater cartridge to create a heat exchanger. As a result, heated gas exits the gas flow element. The gas pressure and gas flow rate can be monitored and/or controlled.

The Flow Control Station can comprise a liquid flow control element comprising single or dual pumps to allow delivery of liquid at a low or high flow rate. The liquid flow control element comprises a sample valve, selector valve, or combinations thereof to allow chemical loading and multiple solvents. In some embodiments, the system can include a nozzle with an integrated exhaust. The nozzle can be configured in a monoblock arrangement where the heater cartridge, heat exchanger, and capillary are all housed within a single unit. Alternatively, the nozzle can be configured in a dual-block arrangement where two blocks are positioned in an adjoining spatial relationship. A first block comprises a heater cartridge and heat exchanger, and a second block comprises a nozzle and capillary. Further, the nozzle can be configured in a separated block arrangement where a first block comprising a heater cartridge and a heat exchanger is separated from a second block comprising a nozzle and a capillary.

Additional aspects of the presently disclosed subject matter can include a tray holder for easier sample loading, more precise alignment of target, and safer operation as the user will no longer put their hands inside the chamber for loading. Double heater controls provide for one for the nozzle and one for the tray holder. A 4× faster nozzle speed resulting from lighter weight XY stage and new type of bearing is provided. Additional aspects include: Control of external pump, smart gutter design for easier clean up and access to filter replacement, and pull out tray that eliminates the need to remove glass panel to load samples and provides easier visual alignment. Additionally provided are multiple height with inserts on drawer, a narrower format for decreased space usage, and an open top for easy servicing. This advantageously allows for easier replacement of electronics if needed, easier access to liquid connections, and easier access to filter for cleaning. A serial port out is provided to pump for integrated control of external pump. Advantageously, this connects to another pump which has switching valves for automated clean up routines. The dual heater control and updated software provides the ability to warm the tray which has uses for faster drying, enzyme digestion on the tray at 37° C., and better stability of the sample as the heated tray makes up for the calories lost during evaporation.

t should be understood that various changes and modifications to the preferred embodiments described herein would be apparent to those skilled in the art. Such changes and modifications can be made without departing from the spirit and scope of the presently disclosed subject matter. It is therefore intended that such changes and modifications be covered by the appended claims. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Particular embodiments and features have been described with reference to the drawings. It is to be understood that these descriptions are not limited to any single embodiment or any particular set of features, and that similar embodiments and features can arise or modifications and additions can be made without departing from the scope of these descriptions and the spirit of the appended claims.

What is claimed is:

1. A system for depositing a Matrix Assisted Laser Desorption Ionisation (MALDI) matrix layer of one or more components onto a biological sample, the system comprising:

a spray assembly for depositing the MALDI matrix layer onto the biological sample, including:

a capillary for receiving and ejecting a fluid comprising the one or more components;

a nozzle for receiving and ejecting a gas towards both the biological sample and the fluid when the fluid is ejected from the capillary to create an atomized spray; and a heater for heating the capillary and the gas;

an enclosure for housing the biological sample and the spray assembly, the enclosure including a translatable drawer for supporting and translating the biological sample;

a sensor to automatically measure wetness of the spray based on a determination of a temperature of a test surface and a time to recover to a normal temperature; and a flow controller configured to:

electronically control a gas flow control element to thereby adjust a flow rate, pressure, or both of the gas when ejected from the nozzle to affect the wetness or dryness of the spray; and use an algorithm to control an evaporation rate and droplet size of the spray for formation of matrix crystals within the MALDI matrix layer based on a measured wetness of the test surface.

2. The system of claim 1, wherein the spray assembly is translatable in two perpendicular directions for maneuvering the spray assembly with respect to the biological sample.

3. The system of claim 1, further comprising a substrate heater for heating the biological sample, the translatable drawer, or both.

4. The system of claim 1, further including a humidity chamber positioned on a top face of the translatable drawer to perform temperature and humidity controlled chemical reaction, wherein the temperature and humidity controlled chemical reaction comprises one or more of enzymatic digestion, derivatization and rehydration.

5. The system of claim 1, further comprising a spray heater, wherein the spray heater includes a fluid spray heater and a gas spray heater, each of the heaters being independently operable.

6. The system of claim 1, further including a second capillary for receiving and ejecting a second fluid containing one or more secondary components.

7. The system of claim 1, wherein the spray assembly is configured on one side of the flow controller and electronic controls of a robot can be connected to an opposite side of the flow controller.

8. The system of claim 1, wherein the flow controller comprises a flexible harness comprising the elements of the spray assembly functionality.

9. The system of claim 1, wherein the nozzle is configured as a monoblock, dual block, or separated block arrangement.

10. The system of claim 1, wherein the flow controller is further configured to adjust the wetness or dryness of the spray to a desired level.

11. The system of claim 1, wherein the spray assembly further includes switching valves for switching from the fluid to one or more of a second fluid and a second gas.

12. The system of claim 1, wherein the spray assembly further includes switching valves for switching from the gas to one or more of a second fluid and a second gas.

* * * * *